United States Patent
Imai et al.

(10) Patent No.: US 8,654,210 B2
(45) Date of Patent: Feb. 18, 2014

(54) ADAPTIVE COLOR IMAGING

(75) Inventors: Francisco Imai, Mountain View, CA (US); John Haikin, Fremont, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 146 days.

(21) Appl. No.: 13/273,180

(22) Filed: Oct. 13, 2011

(65) Prior Publication Data

US 2013/0093919 A1    Apr. 18, 2013

(51) Int. Cl.
*H04N 5/235*    (2006.01)

(52) U.S. Cl.
USPC .................................. 348/230.1; 348/364

(58) Field of Classification Search
USPC ............... 348/229.1, 231.1, 362, 364, 366, 348/187–198, 231.3, 231.6, 272; 382/111, 382/164, 165
See application file for complete search history.

(56) References Cited

U.S. PATENT DOCUMENTS

| | | | |
|---|---|---|---|
| 6,466,961 B1 | 10/2002 | Miller | |
| 7,489,346 B2 | 2/2009 | Mizukura et al. | |
| 7,554,586 B1 | 6/2009 | Imai et al. | |
| 7,860,307 B2 | 12/2010 | Yen et al. | |
| 2008/0310710 A1* | 12/2008 | Berestov et al. | 382/162 |
| 2010/0044822 A1 | 2/2010 | Longoni et al. | |
| 2010/0046060 A1 | 2/2010 | Lee et al. | |
| 2010/0046077 A1 | 2/2010 | Lee et al. | |
| 2010/0053755 A1 | 3/2010 | Lee et al. | |
| 2010/0182598 A1 | 7/2010 | Choi et al. | |
| 2010/0238319 A1* | 9/2010 | Ishibashi | 348/229.1 |
| 2010/0271505 A1* | 10/2010 | Zimmer et al. | 348/231.2 |
| 2011/0026853 A1* | 2/2011 | Gokturk et al. | 382/305 |
| 2012/0274786 A1* | 11/2012 | Wang | 348/187 |
| 2013/0076913 A1* | 3/2013 | Xu et al. | 348/169 |

OTHER PUBLICATIONS

Vrhel, et. al, "Measurement and analysis of object reflectance spectre", Color Res. and Appl., vol. 19, pp. 4-9, 1994.
NSF Award Abstract #0637440, "STTR Phase I: High Resolution Spectrometer-on-a-Chip Based on Nano-Optic Plasmonic Device", amended Dec. 5, 2006.
Longoni, et al., "The transverse field detector (TFD): a novel color-sensitive CMOS device", IEEE Electron Device Letters 29, pp. 1306-1308, 2008.
U.S. Appl. No. 12/949,592, filed Nov. 18, 2010, Applicant: Francisco Imai.
U.S. Appl. No. 13/090,188, filed Apr. 19, 2011, Applicants: John Haikin and Francisco Imai.
U.S. Appl. No. 13/033,578, filed Feb. 23, 2011, Applicants: John Haikin and Francisco Imai.
U.S. Appl. No. 12/859,115, filed Aug. 18, 2010, Applicant: Francisco Imai.

* cited by examiner

*Primary Examiner* — Tuan Ho
*Assistant Examiner* — Zhenzhen Wu
(74) *Attorney, Agent, or Firm* — Fitzpatrick, Cella, Harper & Scinto

(57) ABSTRACT

An image capture device includes an imaging assembly having a spectral sensitivity tunable in accordance with a spectral capture mask. A pre-capture captures a sample image of a scene using the imaging assembly tuned by a first spectral capture mask. A second spectral capture mask is constructed by calculations which use image data of the sample image. The second spectral capture mask is constructed to tune the spectral sensitivity of the imaging assembly so as to adjust respective capture parameters for different objects in the scene. The second spectral capture mask is applied to the imaging assembly. An image of the scene is captured with the second spectral capture mask applied to the imaging assembly.

60 Claims, 13 Drawing Sheets

ADAPTIVE COLOR IMAGING

FIELD

The present disclosure relates to image capture, and more particularly relates to image capture in which capture parameters for an imaging assembly are adjusted.

BACKGROUND

In the field of image capture and post-capture rendering of the captured images, different objects in the scene being captured might be colorimetrically similar. For example, a model with dark skin and black hair might be wearing a black leather jacket and black velvet slacks. These four objects of the scene (i.e., skin, hair, jacket and slacks) all are colorimetrically similar, and all result in a captured image having similar RGB data. During post-capture rendering, however, the photographer or other artist might change these colors slightly, so as to provide a particular artistic intent.

SUMMARY

One difficulty encountered during post-capture, however, concerns differentiation between the objects. In particular, because the objects are similar colorimetrically, it is often difficult for the artist to differentiate between regions that define each different object.

The foregoing situation is addressed during image capture by constructing a capture mask from a sample image to tune the spectral sensitivity of an imaging assembly, so as to automatically adjust the respective visual appearances of objects formed from different materials.

Thus, in an example embodiment described herein, an image capture device includes an imaging assembly having a spectral sensitivity tunable in accordance with a spectral capture mask. A sample image of a scene is captured using the imaging assembly tuned by a first spectral capture mask. A second spectral capture mask is constructed by calculations which use image data of the sample image. The second spectral capture mask is constructed to tune the spectral sensitivity of the imaging assembly so as to adjust respective visual appearances of objects in the scene formed from different materials. The second spectral capture mask is applied to the imaging assembly. An image of the scene is captured with the second spectral capture mask applied to the imaging assembly.

By automatically adjusting the respective visual appearances of objects in the scene formed from different materials, it is ordinarily possible to differentiate and process distinct areas of an image, without requiring the intervention of an artist or photographer.

In one example, a lookup table (LUT) is accessed using a spectral fingerprint of regions in the sample image formed from different materials. The LUT is designed for visual differentiation of objects of different materials in the scene which would otherwise have very similar appearances.

The disclosure contemplates situations where an image capture device includes an imaging assembly with tunable spectral sensitivities. One example of such an imaging assembly includes an image sensor of the type described in "The Transverse Field Detector: A Novel Color Sensitive CMOS Device", Zaraga, IEEE Electron Device Letters 29, 1306-1308 (2008) and U.S. Patent Publication No. 2010/0044822, "Luminous Radiation Colour Photosensitive Structure". These documents describe a transverse field detector (TFD) which has a tunable spectral responsivity that can be adjusted by application of bias voltages to control electrodes. Another example of such an imaging assembly includes an image sensor which is preceded by a color filter array (CFA), and it is the color filter array that has a tunable spectral response. For instance, there is a tunable color filter array described in U.S. Pat. No. 6,466,961 by Miller, "Methods for Adaptive Spectral, Spatial and Temporal Sensing for Imaging Applications".

This brief summary has been provided so that the nature of this disclosure may be understood quickly. A more complete understanding can be obtained by reference to the following detailed description and to the attached drawings.

DETAILED DESCRIPTION

In the following example embodiments, there is described a multi-spectral digital camera which may be a digital still camera or a digital video camera. It is understood, however, that the following description encompasses arbitrary arrangements which can incorporate or utilize imaging assemblies having a spectral response, for instance, a data processing apparatus having an image sensing function (e.g., a personal computer) or a portable terminal having an image sensing function (e.g., a mobile telephone).

Figure 1A:
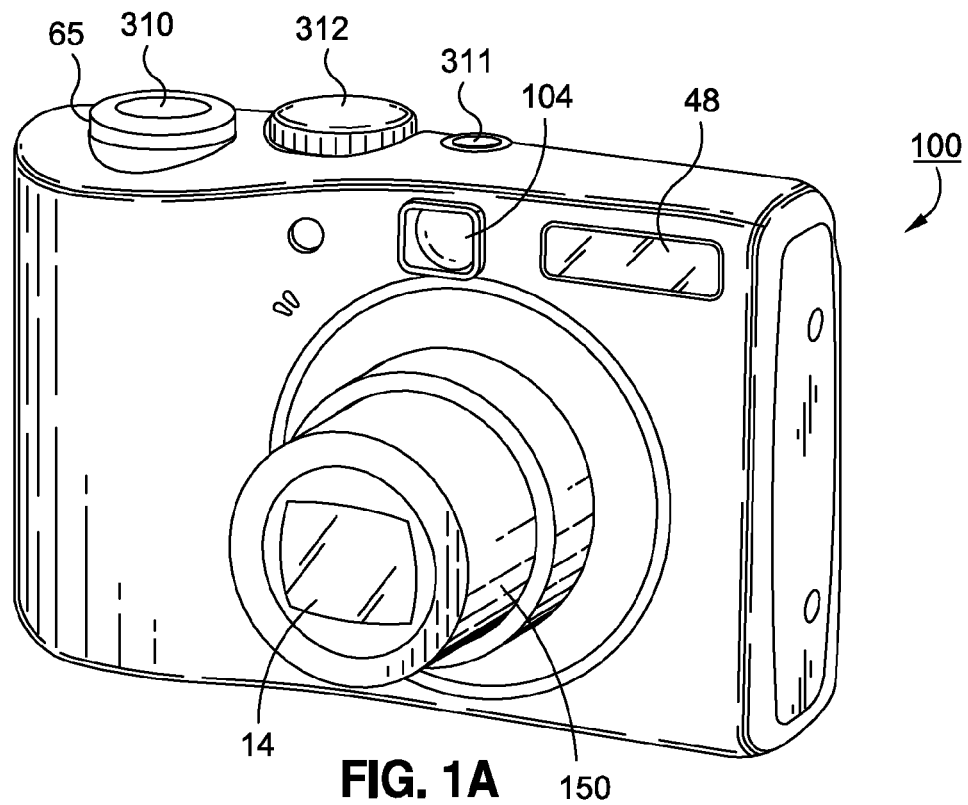
FIGS. 1A and 1B are views depicting an external appearance of an image capture device according to an example embodiment.
Figure 1B:
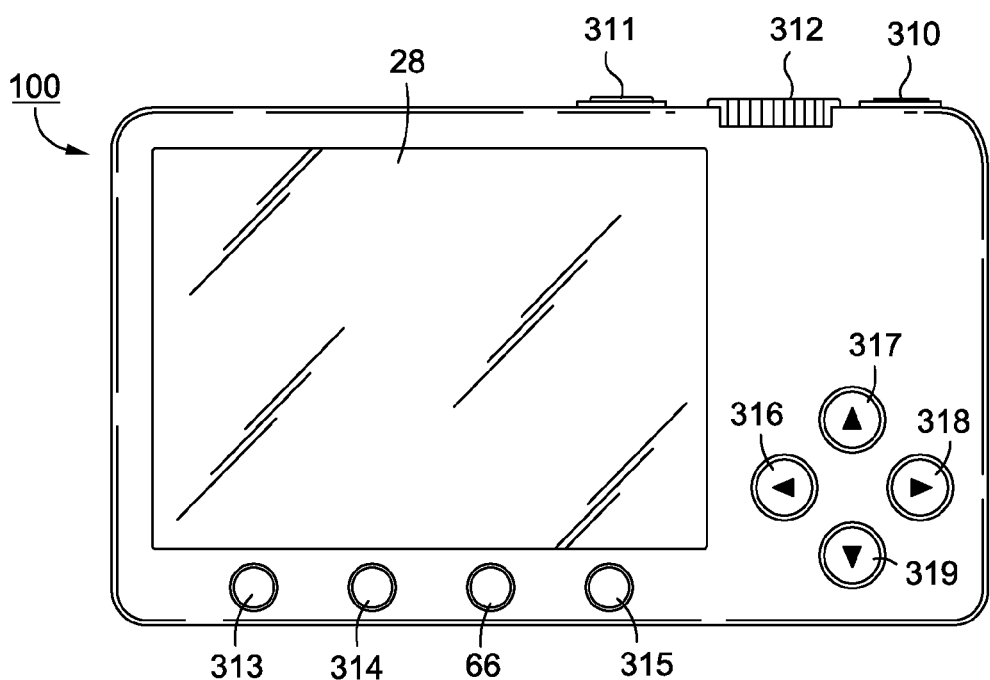

FIGS. 1A and 1B are views showing an example of an external appearance of an image capture device 100 according to an example embodiment. Note that in these figures, some components are omitted for conciseness. A user operates buttons and switches 310 to 319 for turning ON/OFF the power of the digital camera 100, for setting, changing or confirming the shooting parameters, for confirming the status of the camera, and for confirming shot images.

Optical finder 104 is a viewfinder, through which a user can view a scene to be captured. In this embodiment optical finder 104 is separate from image display unit 28, but in some embodiments image display unit 28 may also function as a viewfinder.

Flash (flash emission device) 48 is for emitting auxiliary light to illuminate a scene to be captured, if necessary.

Image sensor 14 that is inside camera 100 is an image sensor which converts an optical image into an electrical signal. In some embodiments, image sensor 14 may be tunable in accordance with a capture parameter. Image sensor 14 will be described more fully below with respect to FIG. 2A.

Imaging system 150 is a camera system which is incorporated with the image sensor 14 in order to provide additional capabilities for capturing spectral information, in the case that image sensor 14 can not capture such information on its own. In that regard, several arrangements are possible for imaging system 150, including a monochrome imaging sensor combined with a filter wheel or a liquid crystal tunable filter, an absorption filter, an additional array of spectral sensing devices, or a color imaging system with tunable spectral sensitivities. These example embodiments are described more fully below with respect to FIGS. 1C to 1G. Imaging system 150 also could be an array of high-spectral resolution sensors that directly measure spectral information such as based on metal waveguides producing surface plasmon polaritons.

In some embodiments image sensor 14 may be constructed to capture high-resolution additional spectral data itself, and thus in some cases the additional hardware of imaging system 150 may not be necessary.

The power button 311 is provided to start or stop the digital camera 100, or to turn ON/OFF the main power of the digital camera 100. The menu button 313 is provided to display the setting menu such as shooting parameters and operation modes of the digital camera 100, and to display the status of the digital camera 100. The menu includes selectable items or items whose values are variable.

A delete button 315 is pressed for deleting an image displayed on a playback mode or a shot-image confirmation screen. In the present embodiment, the shot-image confirmation screen (a so-called quick review screen) is provided to display a shot image on the image display unit 28 immediately after shooting for confirming the shot result. Furthermore, the present embodiment is constructed in a way that the shot-image confirmation screen is displayed as long as a user keeps pressing the shutter button 310 after the user instructs shooting by shutter button depression.

An enter button 314 is pressed for selecting a mode or an item. When the enter button 314 is pressed, the system controller 50 in FIG. 2A sets the mode or item selected at this time. The display ON/OFF button 66 is used for selecting displaying or non-displaying of photograph information regarding the shot image, and for switching the image display unit 28 to be functioned as an electronic view finder.

A left button 316, a right button 318, an up button 317, and a down button 319 may be used for the following purposes, for instance, changing an option (e.g., items, images) selected from plural options, changing an index position that specifies a selected option, and increasing or decreasing numeric values (e.g., correction value, date and time).

Half-stroke of the shutter button 310 instructs the system controller 50 to start, for instance, AF processing, AE processing, AWB processing, EF processing or the like. Full-stroke of the shutter button 310 instructs the system controller 50 to perform shooting.

The zoom operation unit 65 is operated by a user for changing the angle of view (zooming magnification or shooting magnification).

A recording/playback selection switch 312 is used for switching a recording mode to a playback mode, or switching a playback mode to a recording mode. Note, in place of the above-described operation system, a dial switch may be adopted or other operation systems may be adopted.

FIGS. 1C to 1G are views for explaining an imaging system (e.g., imaging system 150) for capturing spectral information according to example embodiments. These embodiments are shown merely for purposes of example, and other arrangements are possible. In that regard, as mentioned above, in some embodiments image sensor 14 may be constructed to capture high-resolution additional spectral data itself, and thus in some cases the additional hardware of imaging system 150 may not be necessary.

Figure 1C:
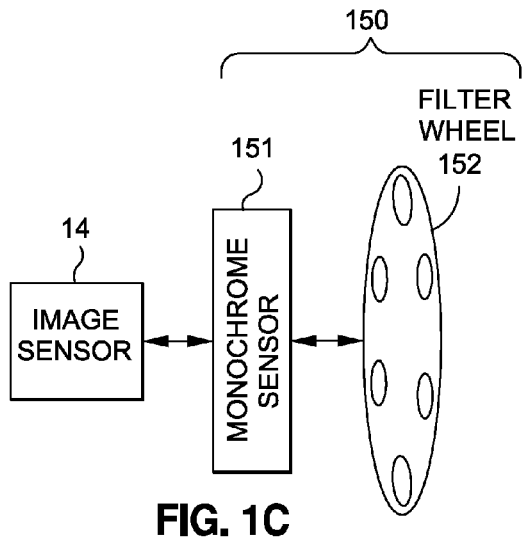
FIGS. 1C to 1G are views for explaining an imaging system according to example embodiments.
Figure 1D:
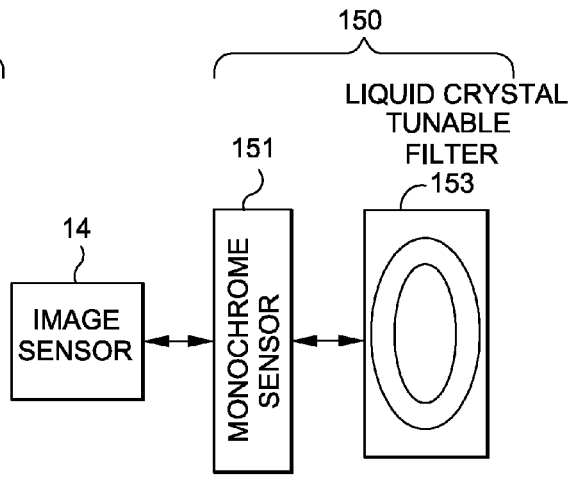

FIGS. 1C and 1D depict embodiments in which image sensor 14 is an RGB sensor combined with an additional imaging sensor. The additional imaging sensor is comprised of a monochrome sensor 151 and a set of narrow-band filters. The narrow-band filters, in turn, can be comprised of a filter wheel 152 (FIG. 1C) with filters with different spectral bands, or a liquid crystal tunable filter 153 (FIG. 1D). Either of these embodiments ordinarily provides relatively high spectral resolution and relatively high spatial resolution. However, due to cost and size of the system, such embodiments ordinarily are only appropriate for high-end imaging of static objects.

Figure 1E:
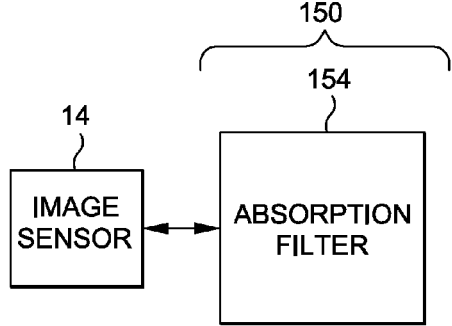

FIG. 1E depicts an embodiment in which image sensor 14 is an RGB sensor combined with an absorption filter 154, for example as shown in U.S. Pat. No. 7,554,586, "System and method for scene image acquisition and spectral estimation using a wide-band multi-channel image capture", the contents of which are incorporated by reference herein. The captured RGB from image sensor 14 without an external filter provides the traditional image capture. Meanwhile, a spectral reflectance estimation process is performed to get higher spectral resolution data from lower spectral resolution captured data provided by the combination of unfiltered images from image sensor 14, and filtered RGB images from absorption filter 154. The external absorption filter 154 changes the overall sensitivities of the original RGB sensor providing three additional channels. This embodiment provides relatively high spatial resolution and is relatively usable for dynamic scenes if the absorption filter 154 is fast-switching, and there is ordinarily no need for a secondary sensor as in the embodiments of FIGS. 1C and 1D. On the other hand, the embodiment of FIG. 1E tends to have relatively low spectral resolution.

Figure 1F:
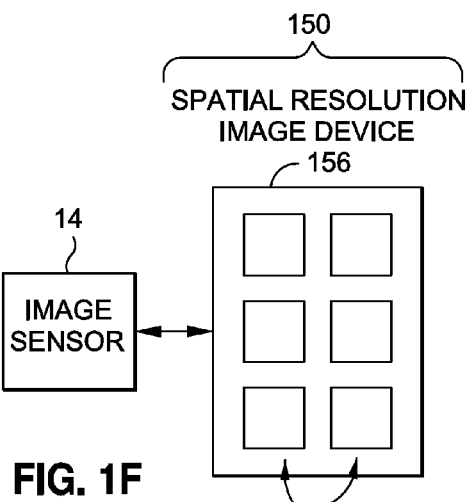

FIG. 1F depicts an embodiment in which image sensor 14 is an RGB sensor combined with an additional high-spectral resolution but low-spatial resolution imaging device 156, for example a device which includes an array of spectral sensing devices 155 with high-spectral resolution, such as described in U.S. Publications No. 2010/0046060, 2010/0046077, 2010/0053755 and 2010/0182598, the contents of which are incorporated by reference herein. Main RGB imaging sensor 14 provides the conventional photography capture, whereas a secondary sensor (array of high-spectral resolution sensors 155) works as a low-spatial resolution but high-spectral resolution spectral measurement device. The arrangement of FIG. 1F provides high spectral resolution with relatively low cost, and can be applied to dynamic scenes. On the other hand, the secondary sensor (e.g., the array of spectral sensing devices) ordinarily has a low spatial resolution.

Figure 1G:
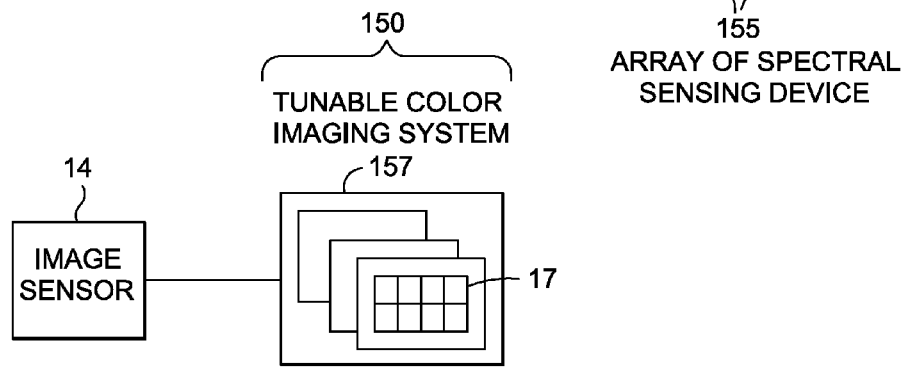

FIG. 1G depicts an example embodiment in which image sensor 14 is an RGB imaging sensor coupled with a color imaging system 157 with tunable spectral sensitivities. The tunable spectral sensitivities may be tunable in accordance with a capture parameter 17. This arrangement is described in detail in U.S. application Ser. No. 12/949,592, filed Nov. 18, 2010, entitled "Adaptive Spectral Imaging by Using an Imaging Assembly with Tunable Spectral Sensitivities", by Francisco Imai, the contents of which are incorporated by reference herein.

As mentioned above, image sensor 14 may itself have high spectral resolution and capture additional multi-spectral data. Thus, additional hardware might not be necessary at all, although multiple captures might be needed. Regardless of the implementation, the spatial resolution of the captured image will be higher than the spectral resolution of the captured image.

Additionally, image sensor 14 can have tunable spectral sensitivities, as described in U.S. application Ser. No. 12/949,592. In such an embodiment, image sensor 14 is a multi-spectral image sensor which has a spectral response which is tunable in accordance with a capture parameter 17. As mentioned above, image sensor 14 may not be tunable, and may instead be coupled with a preceding color filter array which has a tunable spectral response.

In that regard, any of the embodiments above ordinarily will provide enough spectral information to identify, or at least differentiate between, different materials in a scene. As mentioned, some embodiments may capture lower resolution spectral resolution than others, and thus have less accuracy in identifying materials. Nevertheless, even low spectral resolution information may allow for differentiation between distinct areas comprised of different materials.

Figure 2A:
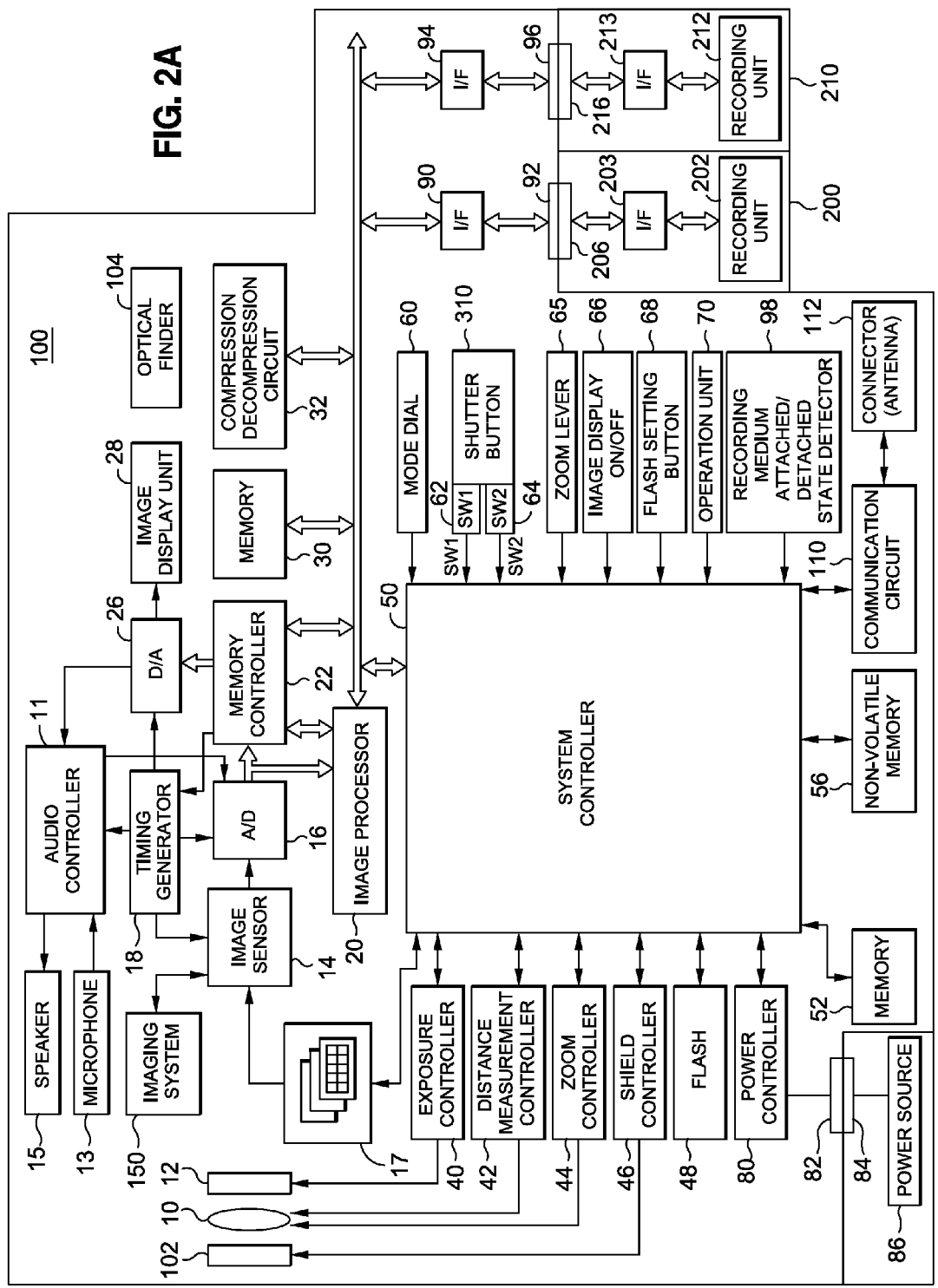
FIGS. 2A and 2B are detailed block diagrams for explaining the internal architecture of the image capture device shown in FIG. 1 according to an example embodiment.

FIG. 2A is a block diagram showing an example of the arrangement of the multi-spectral digital camera 100 as an image capture device according to this embodiment. Referring to FIG. 2, reference numeral 10 denotes an imaging lens; 12, a shutter having an aperture function; and 14, an image sensor which converts an optical image into an electrical signal. Reference numeral 16 denotes an A/D converter which converts an analog signal into a digital signal. The A/D converter 16 is used when an analog signal output from the image sensor 14 is converted into a digital signal and when an analog signal output from an audio controller 11 is converted into a digital signal. Reference numeral 102 denotes a shield, or barrier, which covers the image sensor including the lens 10 of the digital camera 100 to prevent an image capturing system including the lens 10, shutter 12, and image sensor 14 from being contaminated or damaged.

In FIG. 2, an imaging assembly is comprised of image sensor 14 and associated optics, such that in some embodiments the imaging assembly is comprised of image sensor 14 and lens 10. In other embodiments where additional hardware is necessary to capture adequate spectral data, the imaging assembly is comprised of image sensor 14, lens 10 and imaging system 150.

The optical system 10 may be of a zoom lens, thereby providing an optical zoom function. The optical zoom function is realized by driving a magnification-variable lens of the optical system 10 using a driving mechanism of the optical system 10 or a driving mechanism provided on the main unit of the digital camera 100.

A light beam (light beam incident upon the angle of view of the lens) from an object in a scene that goes through the optical system (image sensing lens) 10 passes through an opening of a shutter 12 having a diaphragm function, and forms an optical image of the object on the image sensing surface of the image sensor 14. The image sensor 14 converts the optical image to analog image signals and outputs the signals to an A/D converter 16. The A/D converter 16 converts the analog image signals to digital image signals (image data). The image sensor 14 and the A/D converter 16 are controlled by clock signals and control signals provided by a timing generator 18. The timing generator 18 is controlled by a memory controller 22 and a system controller 50.

In the embodiment shown in FIG. 2A, image sensor 14 is tunable in accordance with a capture parameter 17. The precise nature of the spectral responsivity of image sensor 14 is controlled via capture parameter 17. In this embodiment, capture parameter 17 may be comprised of multiple spatial masks, with one mask each for each channel of information output by image sensor 14. Each spatial mask comprises an array of control parameters corresponding to pixels or regions of pixels in image sensor 14. In this regard, image sensor 14 may be comprised of a transverse field detector (TFD) sensor mentioned hereinabove. The spatial masks may correspond to voltage biases applied to control electrodes of the TFD sensor. The spectral responsivity of each pixel, or each region of plural pixels, is thus tunable individually and independently of other pixels or regions of pixels.

In one example embodiment, image sensor 14 gathers high-resolution spectral data, and outputs, for example, five or more channels of color information, including a red-like channel, a green-yellow-like channel, a green-like channel, a blue-green-like channel, and a blue-like channel. In such an example, where image sensor 14 outputs five or more channels, capture parameter 17 includes a spatial mask DR for the red-like channel of information, a spatial mask DGY for the green-yellow-like channel of information, a spatial mask DG for the green-like channel of information, a spatial mask DBG for the blue-green-like channel of information and a spatial mask DB for the blue-like channel of information.

Figure 3:
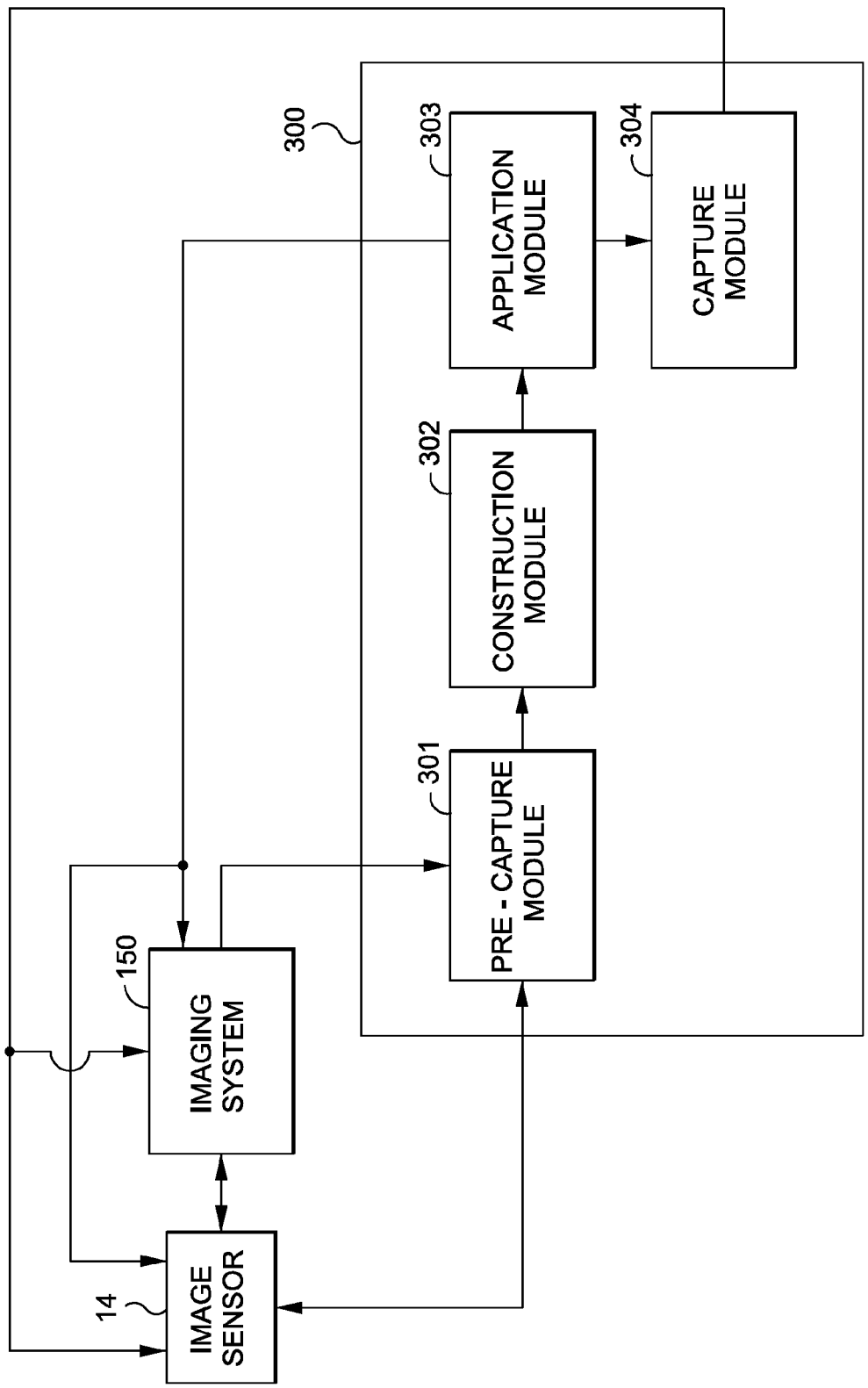
FIG. 3 is a view for explaining an image capture module according to one example embodiment.

In the embodiment shown in FIG. 2A, however, it should be understood that image sensor 14 might also be a conventional RGB sensor, which therefore is combined with imaging system 150 in FIG. 3 to gather the additional spectral information.

Imaging system 150 is a camera system which is incorporated with the image sensor 14 in order to provide additional capabilities for capturing spectral information. In that regard, several arrangements are possible for imaging system 150, including a monochrome imaging sensor combined with a filter wheel or a liquid crystal tunable filter, an absorption filter, an additional array of spectral sensing devices, or a color imaging system with tunable spectral sensitivities, as described above with respect to FIGS. 1C to 1G.

Reference numeral 18 denotes a timing generator, which supplies clock signals and control signals to the image sensor 14, the audio controller 11, the A/D converter 16, and a D/A converter 26. The timing generator 18 is controlled by a memory controller 22 and system controller 50. Reference numeral 20 denotes an image processor, which applies resize processing such as predetermined interpolation and reduction, and color conversion processing to data from the A/D converter 16 or that from the memory controller 22. The image processor 20 executes predetermined arithmetic processing using the captured image data, and the system controller 50 executes exposure control and ranging control based on the obtained arithmetic result.

As a result, TTL (through-the-lens) AF (auto focus) processing, AE (auto exposure) processing, and EF (flash pre-emission) processing are executed. The image processor 20 further executes predetermined arithmetic processing using the captured image data, and also executes TTL AWB (auto white balance) processing based on the obtained arithmetic result. It is understood that in other embodiments, optical finder 104 may be used in combination with the TTL arrangement or in substitution therefor.

Output data from the A/D converter 16 is written in a memory 30 via the image processor 20 and memory controller 22 or directly via the memory controller 22. The memory 30 stores image data which is captured by the image sensor 14 and is converted into digital data by the A/D converter 16, and image data to be displayed on an image display unit 28. The image display unit 28 may be a liquid crystal screen. Note that the memory 30 is also used to store audio data recorded via a microphone 13, still images, movies, and file headers upon forming image files. Therefore, the memory 30 has a storage capacity large enough to store a predetermined number of still image data, and movie data and audio data for a predetermined period of time.

A compression/decompression unit 32 compresses or decompresses image data by adaptive discrete cosine transform (ADCT) or the like. The compression/decompression unit 32 loads captured image data stored in the memory 30 in response to pressing of the shutter 310 as a trigger, executes the compression processing, and writes the processed data in the memory 30. Also, the compression/decompression unit 32 applies decompression processing to compressed image data loaded from a detachable recording unit 202 or 212, as described below, and writes the processed data in the memory 30. Likewise, image data written in the memory 30 by the compression/decompression unit 32 is converted into a file by the system controller 50, and that file is recorded in nonvolatile memory 56 and/or the recording unit 202 or 212, as also described below.

The memory 30 also serves as an image display memory (video memory). Reference numeral 26 denotes a D/A converter, which converts image display data stored in the memory 30 into an analog signal, and supplies that analog signal to the image display unit 28. Reference numeral 28 denotes an image display unit, which makes display according to the analog signal from the D/A converter 26 on the liquid crystal screen 28 of an LCD display. In this manner, image data to be displayed written in the memory 30 is displayed by the image display unit 28 via the D/A converter 26.

The exposure controller 40 controls the shutter 12 having a diaphragm function based on the data supplied from the system controller 50. The exposure controller 40 may also have a flash exposure compensation function by linking up with flash (flash emission device) 48. The flash 48 has an AF auxiliary light projection function and a flash exposure compensation function.

The distance measurement controller 42 controls a focusing lens of the optical system 10 based on the data supplied from the system controller 50. A zoom controller 44 controls zooming of the optical system 10. A shield controller 46 controls the operation of a shield (barrier) 102 to protect the optical system 10.

Reference numeral 13 denotes a microphone. An audio signal output from the microphone 13 is supplied to the A/D converter 16 via the audio controller 11 which includes an amplifier and the like, is converted into a digital signal by the A/D converter 16, and is then stored in the memory 30 by the memory controller 22. On the other hand, audio data is loaded from the memory 30, and is converted into an analog signal by the D/A converter 26. The audio controller 11 drives a speaker 15 according to this analog signal, thus outputting a sound.

A nonvolatile memory 56 is an electrically erasable and recordable memory, and uses, for example, an EEPROM. The nonvolatile memory 56 stores constants, computer-executable programs, and the like for operation of system controller 50. Note that the programs include those for execution of various flowcharts.

Figure 2B:
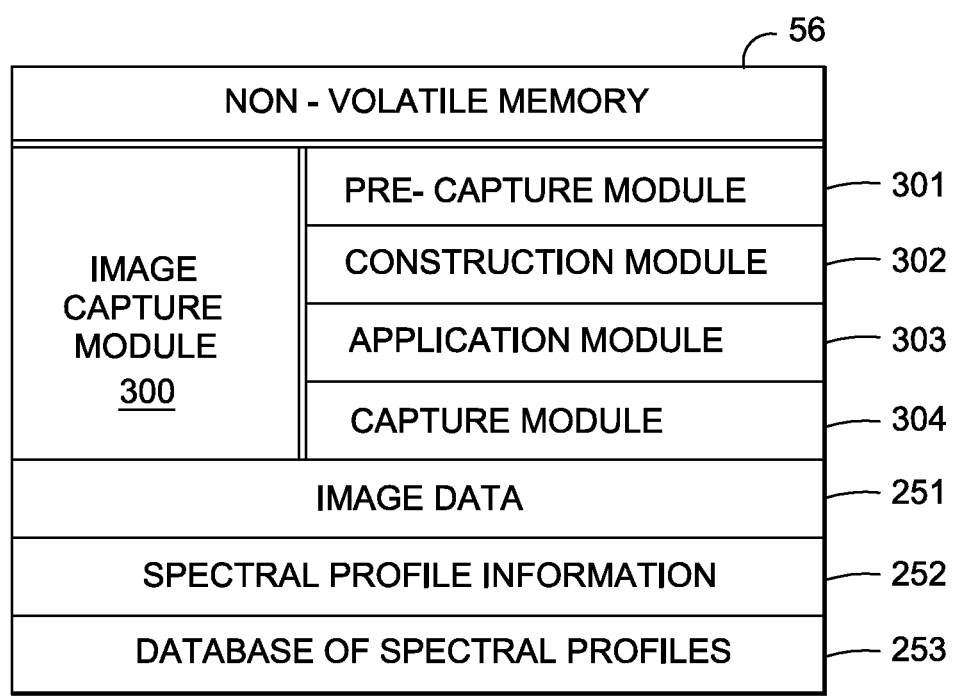

In particular, as shown in FIG. 2B, non-volatile memory 56 is an example of a non-transitory computer-readable memory medium, having retrievably stored thereon image capture module 300 as described herein. According to this example embodiment, the image capture module 300 includes at least a pre-capture module 301 for capturing a sample image of a scene using the imaging assembly tuned by a first spectral capture mask, and a construction module 302 for constructing a second spectral capture mask by calculations which use image data of the sample image. The second spectral capture mask is constructed to tune the spectral sensitivity of the imaging assembly so as to adjust respective capture parameters for different objects in the scene. Image capture module 300 further includes an application module 303 for applying the second spectral capture mask to the imaging assembly, and a capture module 304 for capturing an image of the scene. The image of the scene is captured with the second spectral capture mask applied to the imaging assembly. These modules will be discussed in more detail below with respect to FIG. 3.

Additionally, as shown in FIG. 2B, non-volatile memory 56 also includes image data 251, which includes image data from a scene. The image data for the scene may also be embedded with metadata which identifies materials for objects in the scene. Non-volatile memory 56 further stores spectral profile information 252. Spectral profile information 252 includes information indicating the spectral signature of objects in the scene, and the respective profile information is matched against a database of predetermined spectral profiles 253 in order to identify the materials of the object. Each of these elements will be described more fully below.

Reference numeral 50 denotes a system controller, which controls the entire digital camera 100. The system controller 50 executes programs recorded in the aforementioned non-volatile memory 56 to implement respective processes to be described later of this embodiment. Reference numeral 52 denotes a system memory which comprises a RAM. On the system memory 52, constants and variables required to operate system controller 50, programs read out from the nonvolatile memory 56, and the like are mapped.

A mode selection switch 60, shutter switch 310, and operation unit 70 form operation means used to input various operation instructions to the system controller 50.

The mode selection switch 60 includes the imaging/playback selection switch, and is used to switch the operation mode of the system controller 50 to one of a still image recording mode, movie recording mode, playback mode, and the like.

The shutter switch 62 is turned on in the middle of operation (half stroke) of the shutter button 310 arranged on the digital camera 100, and generates a first shutter switch signal SW1. Also, the shutter switch 64 is turned on upon completion of operation (full stroke) of the shutter button 310, and generates a second shutter switch signal SW2. The system controller 50 starts the operations of the AF (auto focus) processing, AE (auto exposure) processing, AWB (auto white balance) processing, EF (flash pre-emission) processing, and the like in response to the first shutter switch signal SW1. Also, in response to the second shutter switch signal SW2, the system controller 50 starts a series of processing (shooting) including the following: processing to read image signals from the image sensor 14, convert the image signals into image data by the A/D converter 16, process the image data by the image processor 20, and write the data in the memory 30 through the memory controller 22; and processing to read the image data from the memory 30, compress the image data by the compression/decompression circuit 32, and write the compressed image data in non-volatile memory 56, and/or in recording medium 200 or 210.

A zoom operation unit 65 is an operation unit operated by a user for changing the angle of view (zooming magnification or shooting magnification). The operation unit 65 can be configured with, e.g., a slide-type or lever-type operation member, and a switch or a sensor for detecting the operation of the member.

The image display ON/OFF switch 66 sets ON/OFF of the image display unit 28. In shooting an image with the optical finder 104, the display of the image display unit 28 configured with a TFT, an LCD or the like may be turned off to cut the power supply for the purpose of power saving.

The flash setting button 68 sets and changes the flash operation mode. In this embodiment, the settable modes include: auto, flash-on, red-eye reduction auto, and flash-on (red-eye reduction). In the auto mode, flash is automatically emitted in accordance with the lightness of an object. In the flash-on mode, flash is always emitted whenever shooting is performed. In the red-eye reduction auto mode, flash is automatically emitted in accordance with lightness of an object, and in case of flash emission the red-eye reduction lamp is always emitted whenever shooting is performed. In the flash-on (red-eye reduction) mode, the red-eye reduction lamp and flash are always emitted.

The operation unit 70 comprises various buttons, touch panels and so on. More specifically, the operation unit 70 includes a menu button, a set button, a macro selection button, a multi-image reproduction/repaging button, a single-shot/serial shot/self-timer selection button, a forward (+) menu selection button, a backward (−) menu selection button, and the like. Furthermore, the operation unit 70 may include a forward (+) reproduction image search button, a backward (−) reproduction image search button, an image shooting quality selection button, an exposure compensation button, a date/time set button, a compression mode switch and the like.

The compression mode switch is provided for setting or selecting a compression rate in JPEG (Joint Photographic Expert Group) compression, recording in a RAW mode and the like. In the RAW mode, analog image signals outputted by the image sensing device are digitalized (RAW data) as is and recorded.

Note in the present embodiment, RAW data includes not only the data obtained by performing A/D conversion on the photoelectrically converted data from the image sensing device, but also the data obtained by performing lossless compression on A/D converted data. Moreover, RAW data indicates data maintaining output information from the image sensing device without a loss. For instance, RAW data is A/D converted analog image signals which have not been subjected to white balance processing, color separation processing for separating luminance signals from color signals, or color interpolation processing. Furthermore, RAW data is not limited to digitalized data, but may be of analog image signals obtained from the image sensing device.

According to the present embodiment, the JPEG compression mode includes, e.g., a normal mode and a fine mode. A user of the digital camera 100 can select the normal mode in a case of placing a high value on the data size of a shot image, and can select the fine mode in a case of placing a high value on the quality of a shot image.

In the JPEG compression mode, the compression/decompression circuit 32 reads image data written in the memory 30 to perform compression at a set compression rate, and records the compressed data in, e.g., the recording medium 200.

In the RAW mode, analog image signals are read in units of line in accordance with the pixel arrangement of the color filter of the image sensor 14, and image data written in the memory 30 through the A/D converter 16 and the memory controller 22 is recorded in non-volatile memory 56, and/or in recording medium 200 or 210.

The digital camera 100 according to the present embodiment has a plural-image shooting mode, where plural image data can be recorded in response to a single shooting instruction by a user. Image data recording in this mode includes image data recording typified by an auto bracket mode, where shooting parameters such as white balance and exposure are changed step by step. It also includes recording of image data having different post-shooting image processing contents, for instance, recording of plural image data having different data forms such as recording in a JPEG form or a RAW form, recording of image data having the same form but different compression rates, and recording of image data on which predetermined image processing has been performed and has not been performed.

A power controller 80 comprises a power detection circuit, a DC-DC converter, a switch circuit to select the block to be energized, and the like. The power controller 80 detects the existence/absence of a power source, the type of the power source, and a remaining battery power level, controls the DC-DC converter based on the results of detection and an instruction from the system controller 50, and supplies a necessary voltage to the respective blocks for a necessary period. A power source 86 is a primary battery such as an alkaline battery or a lithium battery, a secondary battery such as an NiCd battery, an NiMH battery or an Li battery, an AC adapter, or the like. The main unit of the digital camera 100 and the power source 86 are connected by connectors 82 and 84 respectively comprised therein.

The recording media 200 and 210 comprise: recording units 202 and 212 that are configured with semiconductor memories, magnetic disks and the like, interfaces 203 and 213 for communication with the digital camera 100, and connectors 206 and 216. The recording media 200 and 210 are connected to the digital camera 100 through connectors 206 and 216 of the media and connectors 92 and 96 of the digital camera 100. To the connectors 92 and 96, interfaces 90 and 94 are connected. The attached/detached state of the recording media 200 and 210 is detected by a recording medium attached/detached state detector 98.

Note that although the digital camera 100 according to the present embodiment comprises two systems of interfaces and connectors for connecting the recording media, a single or plural arbitrary numbers of interfaces and connectors may be provided for connecting a recording medium. Further, interfaces and connectors pursuant to different standards may be provided for each system.

For the interfaces 90 and 94 as well as the connectors 92 and 96, cards in conformity with a standard, e.g., PCMCIA cards, compact flash (CF) (registered trademark) cards and the like, may be used. In this case, connection utilizing various communication cards can realize mutual transfer/reception of image data and control data attached to the image data between the digital camera and other peripheral devices such as computers and printers. The communication cards include, for instance, a LAN card, a modem card, a USB card, an IEEE 1394 card, a P1284 card, an SCSI card, and a communication card for PHS or the like.

The optical finder 104 is configured with, e.g., a TTL finder, which forms an image from the light beam that has gone through the lens 10 utilizing prisms and mirrors. By utilizing the optical finder 104, it is possible to shoot an image without utilizing an electronic view finder function of the image display unit 28. The optical finder 104 includes indicators, which constitute part of image display unit 28, for indicating, e.g., a focus state, a camera shake warning, a flash charge state, a shutter speed, an f-stop value, and exposure compensation.

A communication circuit 110 provides various communication functions such as USB, IEEE 1394, P1284, SCSI, modem, LAN, RS232C, and wireless communication. To the communication circuit 110, a connector 112 can be connected for connecting the digital camera 100 to other devices, or an antenna can be provided for wireless communication.

A real-time clock (RTC, not shown) may be provided to measure date and time. The RTC holds an internal power supply unit independently of the power supply controller 80, and continues time measurement even when the power supply unit 86 is OFF. The system controller 50 sets a system timer using a date and time obtained from the RTC at the time of activation, and executes timer control.

FIG. 3 is a view for explaining an image capture module according to one example embodiment. As previously discussed with respect to FIG. 2B, image capture module 300 comprises computer-executable process steps stored on a non-transitory computer-readable storage medium, such as non-volatile memory 56. More or less modules may be used, and other architectures are possible.

As shown in FIG. 3, image capture module 300 at least a pre-capture module 301 for capturing a sample image of a scene using the imaging assembly tuned by a first spectral capture mask. To that end, pre-capture module 301 communicates with image sensor 14 and/or imaging system 150, each of which may which gather image data from a scene, along with associated spectral information (e.g., from image sensor 14 if image sensor 14 can capture such data, or from imaging system 150 if image sensor 14 is a conventional RGB sensor). Image sensor 14 and/or imaging system 150 may be tuned to a first capture mask as described below. Pre-capture 301 transmits the image data for the scene and the spectral information to construction module 302, which constructs a second spectral capture mask by calculations which use image data of the sample image. The second spectral capture mask is constructed to tune the spectral sensitivity of the imaging assembly so as to adjust respective capture parameters for different objects in the scene. Construction module 302 also communicates with application module 303, which applies the second spectral capture mask to the imaging assembly. To that end, application module 303 is connected to image sensor 14 and/or imaging system 150. Application module 303 also communicates with capture module 304, which communicates with image sensor 14 and/or imaging system 150 to capture an image of the scene with the second spectral capture mask applied to the imaging assembly. Each of these processes will be described more fully below.

Figure 4A:
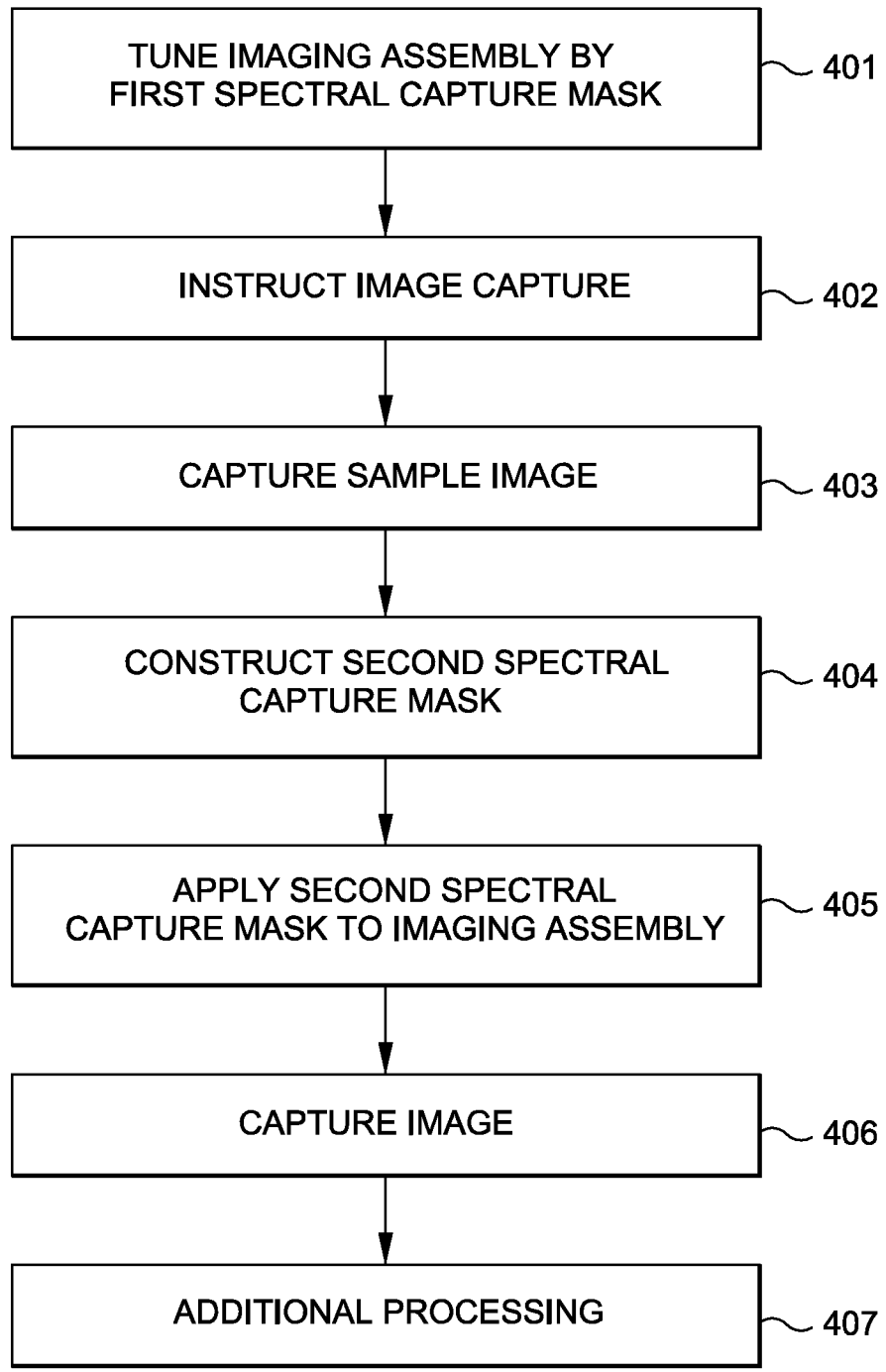
FIGS. 4A and 4B are flow diagrams for explaining processing in the image capture device shown in FIG. 1 according to an example embodiment.
Figure 4B:
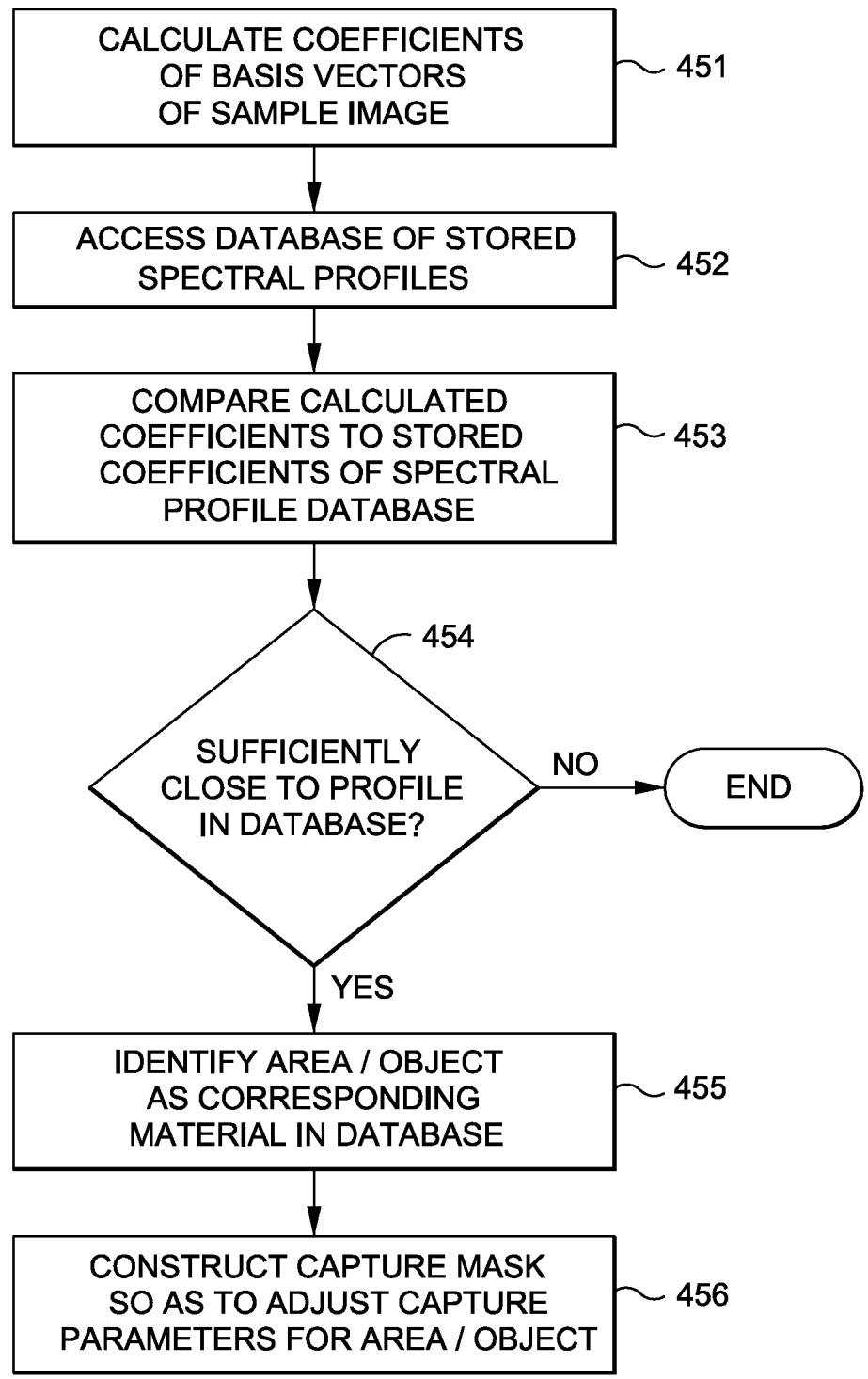

FIGS. 4A and 4B are flow diagrams for explaining processing in the image capture device shown in FIG. 1 according to an example embodiment.

Briefly, in FIG. 4A, an image capture device includes an imaging assembly having a spectral sensitivity tunable in accordance with a spectral capture mask. A pre-capture captures a sample image of a scene using the imaging assembly tuned by a first spectral capture mask. A second spectral capture mask is constructed by calculations which use image data of the sample image. The second spectral capture mask is constructed to tune the spectral sensitivity of the imaging assembly so as to adjust respective capture parameters for different objects in the scene. The second spectral capture mask is applied to the imaging assembly. An image of the scene is captured with the second spectral capture mask applied to the imaging assembly.

In more detail, in step 401, the imaging assembly is tuned by a first spectral capture mask. The first spectral capture mask may have high spectral dimensionality, e.g., with more than three spectral components. The first spectral capture mask may reflect default parameters which are set on manufacture or calibration or are set by the user, and may reflect average values for capturing an image under average conditions. Of course, the first spectral capture mask could also reflect some initial adjustments by the photographer, such as, for example, a nighttime setting.

In step 402, a user instructs image capture, for example by full-stroke of the shutter button 310.

In step 403, the image capture device captures a sample image. In particular, upon instruction of image capture, light beam (light beam incident upon the angle of view of the lens) from an object in a scene that goes through the optical system (image sensing lens) 10 passes through an opening of the shutter 12 having a diaphragm function, and forms an optical image of the object on the image sensing surface of the image sensor 14. The image sensor 14 converts the optical image to analog image signals and outputs the signals to an A/D converter 16. The A/D converter 16 converts the analog image signals to digital image signals (image data).

In addition, spectral information is captured along with the raw image data, by image sensor 14 (if image sensor 14 is capable of capturing sufficient spectral data on its own, the spectral profile information for the scene is calculated from the captured image data of the scene) or by a combination of image sensor 14 and imaging system 150 (if image sensor 14 is not capable of capturing sufficient spectral data on its own). Example embodiments for capturing the spectral information are described above with respect to FIGS. 1C to 1G.

The spectral information may include, for example, five or more channels of color information, including a red-like channel, a green-yellow-like channel, a green-like channel, a blue-green-like channel, and a blue-like channel. The image data may be comprised of tri-stimulus device independent image data, e.g., XYZ image data.

In step 404, a second spectral capture mask is constructed by calculations which use image data of the sample image. The second spectral capture mask is constructed to tune the spectral sensitivity of the imaging assembly so as to adjust respective capture parameters for different objects in the scene. For example, the second spectral capture mask can be constructed to tune the spectral sensitivity of the imaging assembly so as to permit visual differentiation between objects in the scene formed from different materials but which would otherwise have similar tri-stimulus color values. Returning to the example of the fashion model above, the capture mask might be constructed so as to boost the red component (correlated to the presence of hemoglobin in human skin) so as to create a differentiation between the model's hair and the model's skin. Thus, in this example, the second capture mask would be constructed so as to increase the response of the red channel for the skin color.

In one example, the second capture mask might be constructed using a Look Up Table (LUT) which maps materials to adjustments corresponding to the material. For example, a LUT may map an object or area identified as ocean water to an adjustment which amplifies the blue of the ocean, or map objects identified as grass or leaves to an adjustment which amplifies the green. Or, using the example above, the LUT might map colorimetrically similar areas of a fashion model (hair, jacket, skin, etc.) to adjustments which boost color channels differently for each material. The materials in the scene, in turn, are identified from the captured spectral information for the scene, as described more fully below with respect to FIG. 4B.

Thus, a lookup table (LUT) is accessed using a spectral fingerprint of regions in the sample image formed from different materials. In some cases, the LUT is designed for visual differentiation of objects of different materials in the scene which would otherwise have very similar appearances. Thus, compensation values for the voltages for each pixel can then be derived, and the compensation voltages can be applied to the tunable image sensor 14 or imaging assembly 150.

In step 405, the second spectral capture mask is applied to the imaging assembly. As mentioned above, the mask may tune the spectral sensitivity of the imaging assembly so as to permit visual differentiation between objects in the scene formed from different materials but which would otherwise have similar tri-stimulus color values.

In step 406, an image is captured with the second spectral capture mask applied to the imaging assembly. Thus, the user is provided with an image in which aspects of each material identified in the scene are adjusted (e.g., emphasized), so as to permit better visual differentiation between the different materials in the scene. As with the captured sample image data, the captured image data may be comprised of tri-stimulus device independent image data, e.g., XYZ image data.

Thus, it is ordinarily possible to segment and separately augment or emphasize areas in the scene after capturing the sample image. For example, contiguous pixels within a certain range of spectral values can be determined to correspond to area or an object (e.g., pixels which correspond to "red apple"). Following such segmentation, coefficients can be calculated from a part (centroid, average, median, etc.) of the area for comparison against the spectral profiles in the database, and the area could be augmented according to the matching profile, if any.

Thus, in one example, a picture of the sea on a sunny day might include diffuse light, and close values for the sky and sea. Spectral imaging can segment the scene into the sea and the sky into separate areas with different coefficients, and augment or adjust each area respectively as fits that object. As noted above, other examples of adjustments include saturating colors for graphic arts applications or foliage such as leaves, making sky or sea bluer, or compensating for cultural/fashion differences (e.g., a preference for skin color to be closer to a neutral white, vs. tan skin).

A brief example of applying the mask will now be described. In this example, assume that an area of a scene has been identified as sky, with spectral signature A.

Before applying the second spectral capture mask, the product RP between can be calculated by RP=pinv (T1) A pinv ($S_{base}$), wherein pinv indicates the Moore-Penrose pseudo-inverse transformation, R is the matrix of spectral reflectances, P is a diagonal matrix with the spectral power of illumination in the diagonal, T1 is a precalculated transformation based on the coefficients and determined by calibration, A is the spectral signature of the material, and $S_{base}$ is the original spectral sensitivity of the sensor.

The new parameters for the capture mask can be determined according to $S_{new}$=A pinv ($T_{new}$) pinv(RP), wherein $S_{new}$, is the new spectral sensitivity of the sensor, $T_{new}$, is a transformation based on who to modify the old values (e.g. coefficients of eigenvectors representing spectral data into the new values according to the LUT), R is the spectral reflectance matrix, and P is the spectral power of illumination as above. For the above calculations, there is ordinarily no need to separate illumination from reflectance, as only the product of the two (RP) need be known. In that regard, there may not be a clear transformation from $S_{new}$ to specific voltage values for pixels. Accordingly, it might be useful to construct another LUT using experiments with different voltages, to correlate voltages to different spectral curves.

In step 407, additional processing may be performed on the captured image. For example, even with the image captured with the second capture mask under which colors or other aspects of material are emphasized, an artist or renderer may nonetheless wish to further edit or adjust colors. This process can ordinarily be made easier by specifically identifying the areas corresponding to each material.

Thus, in one example aspect, metadata which identifies materials for objects in the scene is constructed. Using the metadata, it is possible to determine a location of one or more objects in the scene comprised of a particular identified material, which can be used by an artist or photographer for even further processing of the capture image.

In particular, the metadata can be embedded with the image data for the scene. For example, the metadata can be embedded as additional data for each pixel in the scene. This method may be useful in a wide assortment of situations, as the pixel data can be compressed and offloaded to an application (or elsewhere) for processing. Alternatively, the metadata can be embedded by constructing an array for each respective material corresponding to pixels in the image, and indicating pixels of that material with values in the array. This latter method may be more efficient in scenes with a relatively small number of materials. In that regard, the metadata can be constructed as a spatial mask, and this spatial mask can be used as a metadata that is superimposed over the captured RGB image. Further explanation can be found in U.S. application Ser. No. 13/090,188, filed Feb. 23, 2011, titled "Image Capture and Post-Capture Processing", by John Haikin and Francisco Imai, the contents of which are incorporated by reference herein.

In that regard, image data having similar tri-stimulus values can rendered differently in dependence on the metadata. For example, using the example above, an artist could use the information indicating the respective locations of the hair and skin to adjust shadow detail or other effects for the hair and skin appropriately (and separately). In one example, management of image data having similar tri-stimulus values is directed differently in an output-referred color space in dependence on the metadata. For example, a photographer could use the located materials to separate an image into separate layers, which could then be adjusted independently, e.g., in Adobe Photoshop™ In one practical example, cosmetics with different spectral signatures can be respectively applied to different people in a scene, and the metadata can be used to identify a person in the scene using the spectral signature of a cosmetic applied to that person.

FIG. 4B is a flow diagram indicating a process for constructing the second capture mask, and FIGS. 5 to 9 illustrate example data for constructing the mask.

Briefly, in FIG. 4B, spectral information of the image data of the sample image is matched against plural spectral profiles of which each maps a material to a corresponding spectral profile, so as to identify the different materials in the scene. The matching includes calculating spectral profile information for the scene from the captured image data for the sample image, accessing a database of the plural spectral profiles of which each maps a material to a corresponding spectral profile reflected therefrom, matching the spectral profile information for the scene against the database, and identifying materials for objects in the scene by using matches between the spectral profile information for the scene against the database.

For purposes of explanation, the description below refers to basis vectors. One example of a basis vector is an eigenvector, but it should be understood that other types of basis vectors could be used. For example, the basis vectors do not need to be orthogonal, and the basis functions could be derived through singular value decomposition (SVD) or principal component analysis (PCA).

In step 451, coefficients of basis vectors of the sample image are calculated, using spectral profile information from the captured spectral data of the sample image.

Figure 5:
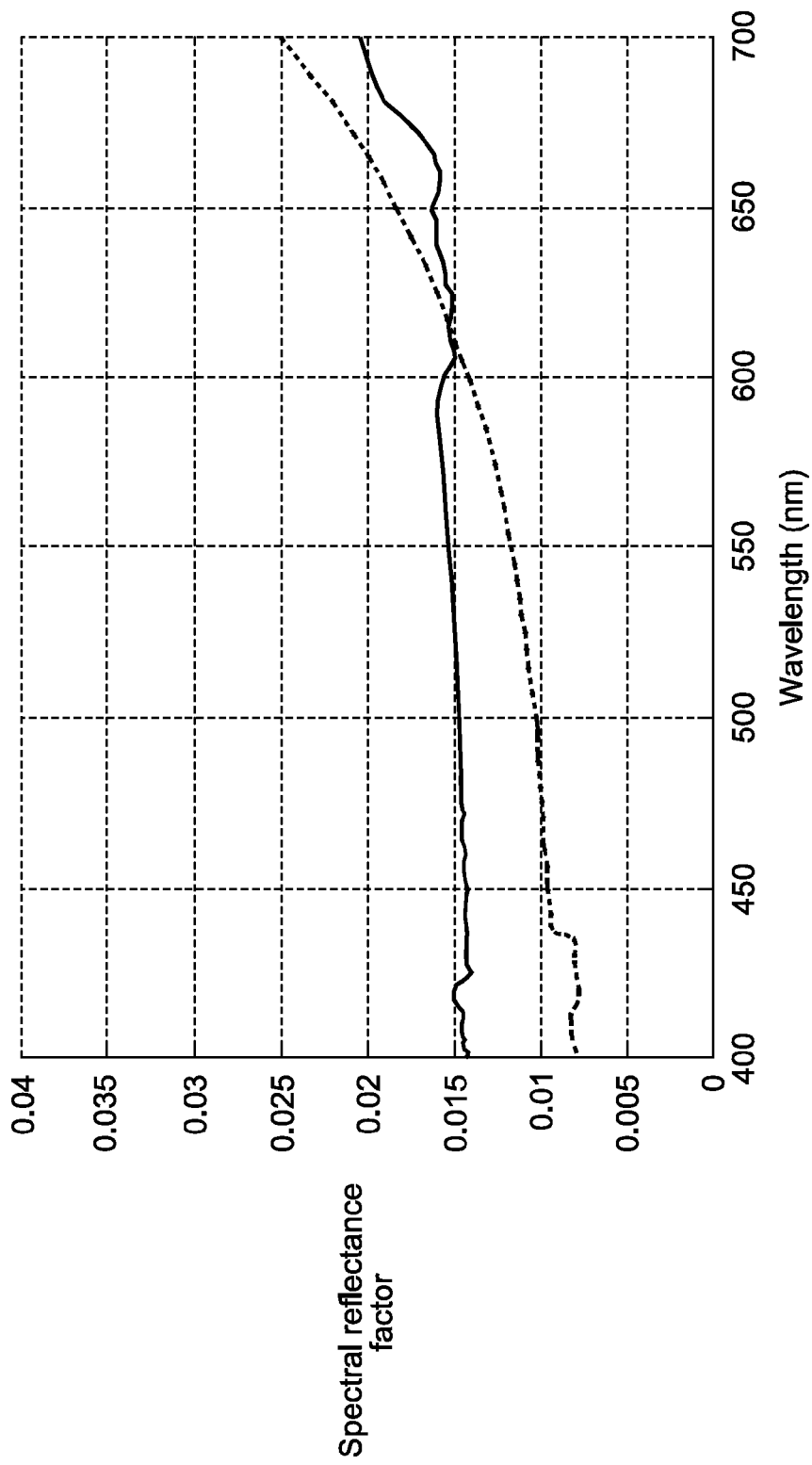
FIG. 5 is a view for explaining spectral reflectance factors according to an example embodiment.

For example, assume a model of African origin whose face skin has a spectral reflectance R_skin and who has black hair with spectral reflectance R_hair. The typical spectral reflectance curves are shown in FIG. 5. It is clear from FIG. 5 that hair and skin have very distinct spectral reflectance properties.

Figure 6:
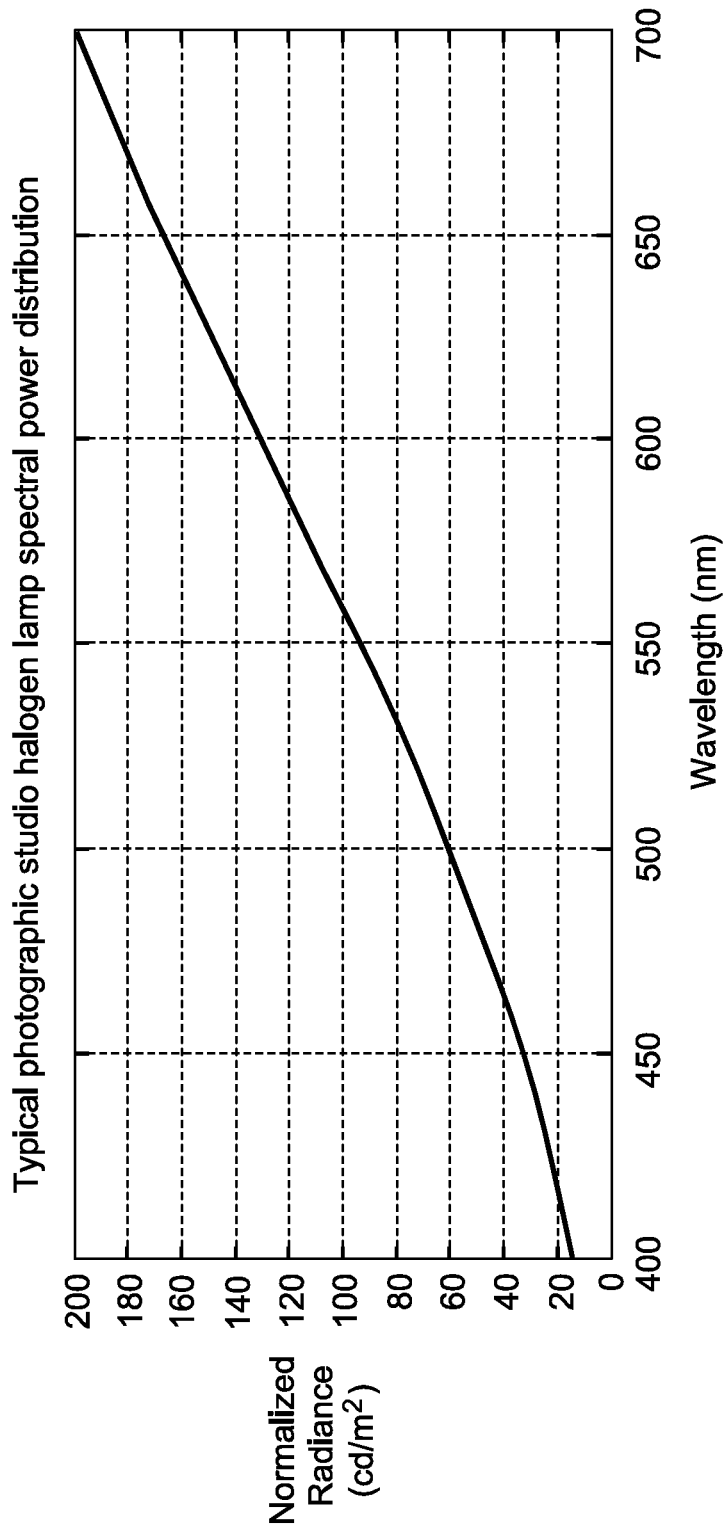
FIG. 6 is a view for explaining a spectral power distribution according to one example embodiment.
Figure 7:
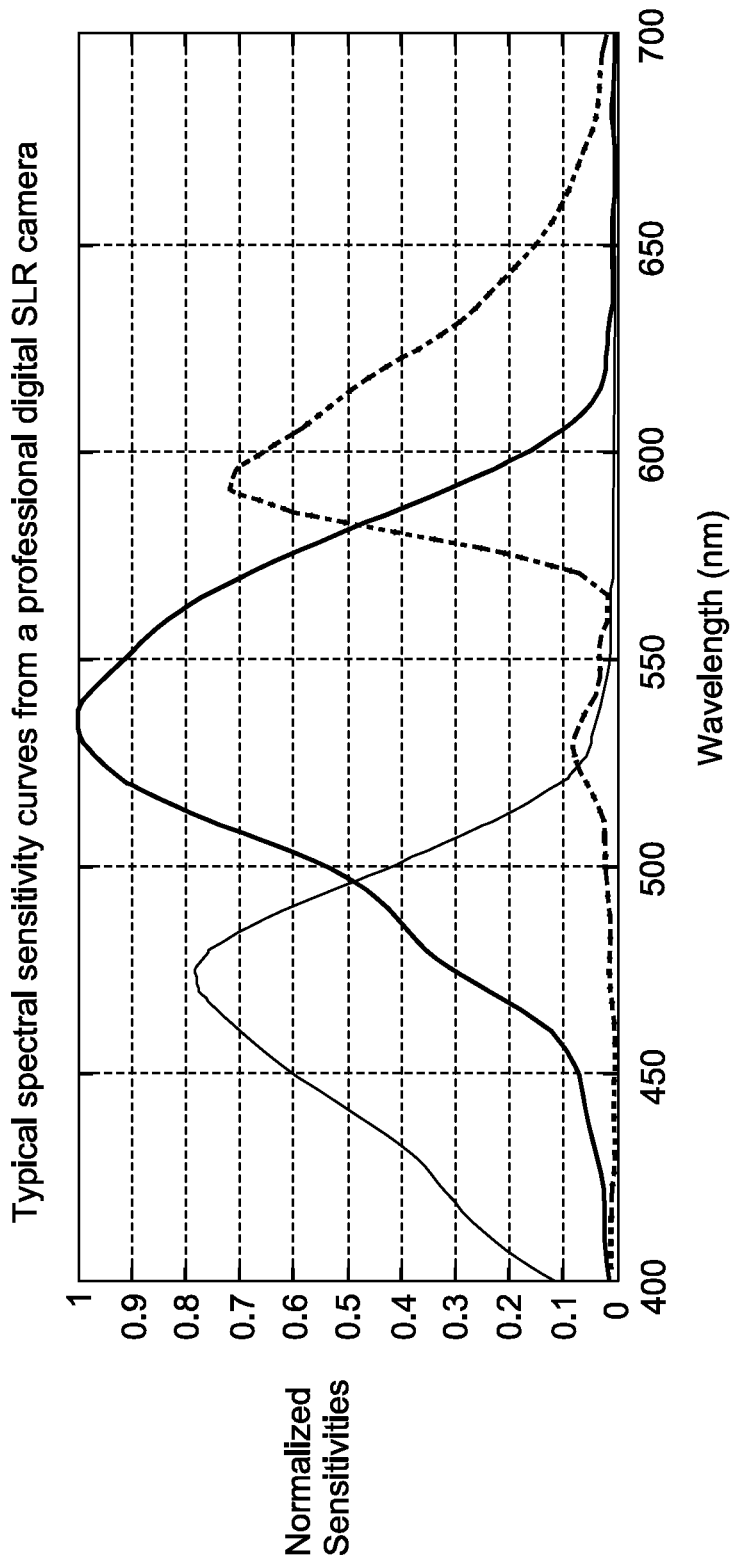
FIG. 7 is a view for explaining spectral sensitivity curves according to an example embodiment.

First, assume the model is imaged under typical photographic studio halogen lamps (whose spectral power distribution is shown in FIG. 6) and the model pictures are taken by a conventional professional digital SLR whose typical red-green-blue spectral sensitivities are shown in FIG. 7. When the digital images are captured, they include average values of Red_hair=24, Green_hair=14 and Blue_hair=7 for hair and average values of Red_skin=24, Green_skin=11 and Blue_skin=5 for skin. The camera values for dark skin and black hair are extremely similar, making them somewhat undistinguishable.

On the other hand, an imaging system that has a secondary spectral measurement sensor (e.g., any of FIGS. 1C to 1G) or an image sensor 14 with high spectral resolution captures spectral reflectance values for multiple regions of the image including hair and skin, respectively R_hair and R_skin. These measurements correspond to what is depicted in FIG. 5.

The spectral profile information may be obtained from spectral data from image sensor 14 (if capable of capturing sufficient spectral data on its own) or a combination of image sensor 14 and imaging system 150 (if image sensor 14 is not capable of capturing sufficient spectral data on its own). For example, in an example embodiment in which each pixel has five channels, each pixel is integrated to produce five digital signals, one signal for each channel. Each channel is tuned to a spectral band within the visible spectrum. Therefore, the digital signal for each channel corresponds to a respective spectral reflectance curve within the visible spectrum.

Thus, spectral data gathered by imaging system 150 (or image sensor 14, if acting alone) is converted into a spectral reflectance curve, generally in the range from 400 to 700 nm of visible light. In that regard, spectral data may have up to 61 (with sampling rate of 5 nm) or more separate values. Comparing all of these values can be relatively inefficient. Accordingly, since spectral reflectance curves are generally smooth, it is ordinarily possible to use fewer values (i.e., less than the 61 discrete values), and basis vectors can be used to reduce the required processing. More specifically, typically 6 basis vectors can represent 99% of full vectors. Of course, more or fewer basis vectors could be used depending on the desired accuracy.

By assuming the relative smoothness of most of spectral reflectance curves it is possible to reduce the number of components of spectral data to six basis vectors by performing basis vector analysis. A transformation from the six capture signals to the coefficients of basis vectors can be produced by a training set of captured images of objects with known representative spectral reflectances. Once the image is captured, the transformation is used to calculate the coefficients of the basis vectors for each pixel of the image.

Thus, calculating spectral profile information for the scene can include calculating coefficients of basis vectors of the image data for a predesignated set of more than three basis vectors. Specifically, basis vectors and their coefficients can represent the spectral data. The pre-calculated basis vectors are used to decompose the captured spectral curves into coefficients, which can then be compared with coefficients in the database. The pre-calculated basis vectors can be generated before image capture from common captured spectral reflectances, such as skin, clothes, hair and the like. Alternatively, basis vectors could be pre-calculated for every possible reflectance, although this approach might require significant resources.

In one approach, the spectral reflectance of a collection of objects $R\lambda$_collection is statistically analyzed. Basis vector analysis is performed and 6 basis vectors $e_i$ (where i=1 to 6) are pre-calculated. Any reflectance $R\lambda$_j (where j=1 to m, where m is the number of objects in the collection) in the collection of objects could be reconstructed by combining the basis vectors $e_j$.

Meanwhile, the estimation of the spectral reflectance for a captured object j is given by $R\lambda$_j_estimation=$\Sigma a_i * e_i$ where $a_i$ are the coefficients of the basis vectors for object j. The coefficients of the basis vectors (represented here by a vector $A_j$ whose dimensions are i by 1) can be estimated from captured digital signals $D_j$ of object j by a pre-calculated transformation T from captured digital signals to basis vectors: $A_j = T * D_j$. Accordingly, it is possible to obtain the coefficients of the basis vectors from the captured spectral reflectance curves, which can then be compared with coefficients of basis vectors from the database of plural spectral profiles to see if there is a match.

In some example embodiments such as that shown in FIG. 1F, due to the high number of components (e.g., R, G, B, and others) of the spectral information, it is difficult to deal with spectral data as signatures for objects. One possibility to deal with the burden of the high number of components is by relating coefficients of basis vectors $A_j$ associated to a particular object j. In such a configuration, the measured spectra can be decomposed by the pre-calculated basis vectors ei as follows: $A_j = R\lambda$_j*pinv($e_i$), where pinv is the pseudo-inverse operation.

When the coefficients of basis vectors are calculated for the captured black hair data it gives the following values are produced: A_hair=[0.006, −0.011, −0.001, −0.007, 0.017, 0.118], while the values for dark skin are given by A_skin=[0.0002, −0.029, −0.027, −0.035, −0.043, 0.429]. In this case, the spectral signatures given by the coefficients of basis vectors are distinct between dark skin and black hair.

Returning to FIG. 4B, in step 452, a database of plural spectral profiles is accessed. The database of plural spectral profiles may be stored in non-volatile memory 56, as shown by database of spectral profiles 253 in FIG. 2B. In another embodiment, the database of plural spectral profiles could be stored remotely in a server, provided that such server can be accessed from image capture device 100, i.e., as long as image capture device 100 has remote data access capabilities. Each of the plural spectral profiles maps a material to a corresponding spectral profile reflected therefrom. Each spectral profile is comprised of stored coefficients of basis vectors for a predesignated set of more than three basis vectors.

Figure 8:
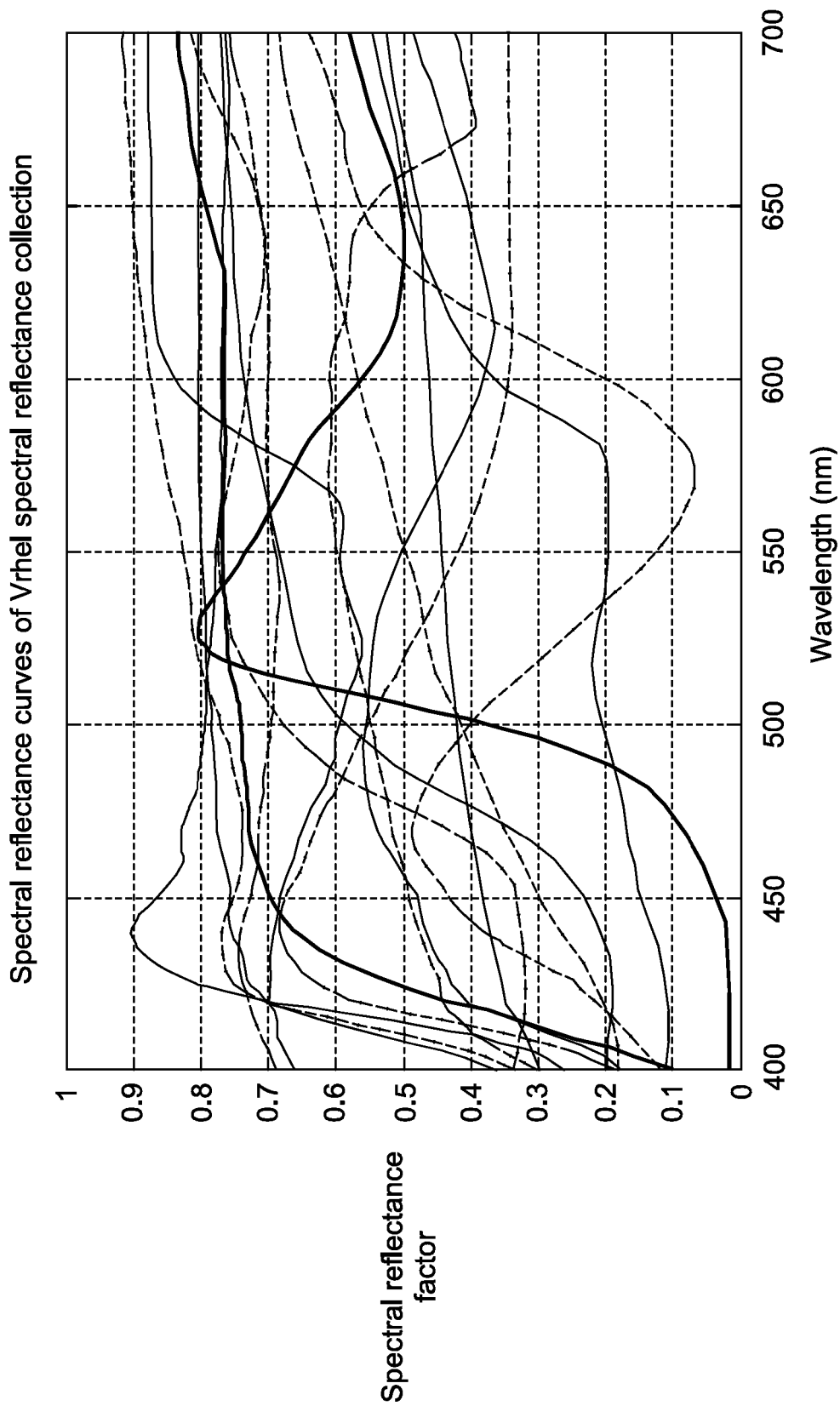
FIG. 8 is a view for explaining a database of plural spectral profiles according to an example embodiment.

FIG. 8 depicts an example of such a database. More specifically, FIG. 8 depicts a spectral database (such as the Vrhel database: Vrhel, M. J., R. Gershon, and L. S. Iwan, Measurement and analysis of object reflectance spectra, Color Res. and Appl., 19, 4-9, 1994, the contents of which are incorporated by reference herein. This database is comprised by spectral measurement of 170 objects. In that regard, for purposes of conciseness, the full database is not shown in FIG. 8. The database is one example of a pre-loaded set of spectral profiles in the form of computed eigenvectors and a look-up table (LUT) with typical spectral signatures (coefficients of eigenvectors) of most commonly imaged objects, such as skin, hair, vegetation, sky, etc. Further explanation can be found in U.S. application Ser. No. 13/090,188, filed Apr. 19, 2011, titled "Adaptive Spectral Imaging By Using An Imaging Assembly With Tunable Spectral Sensitivities", by Francisco Imai, the contents of which are incorporated by reference herein. While these spectral databases do not cover all possible spectral reflectances of objects, the database is ordinarily sufficient to cover most cases.

In some examples, a narrower database could be selected or used. For example, if the photographer knows the situation or environment that he/she will be shooting in, it might be possible to select a narrower database of spectral profiles corresponding better to that environment. In addition, databases might be uploadable or downloadable between the image capture device and other devices, so as to facilitate sharing of databases.

Figure 9:
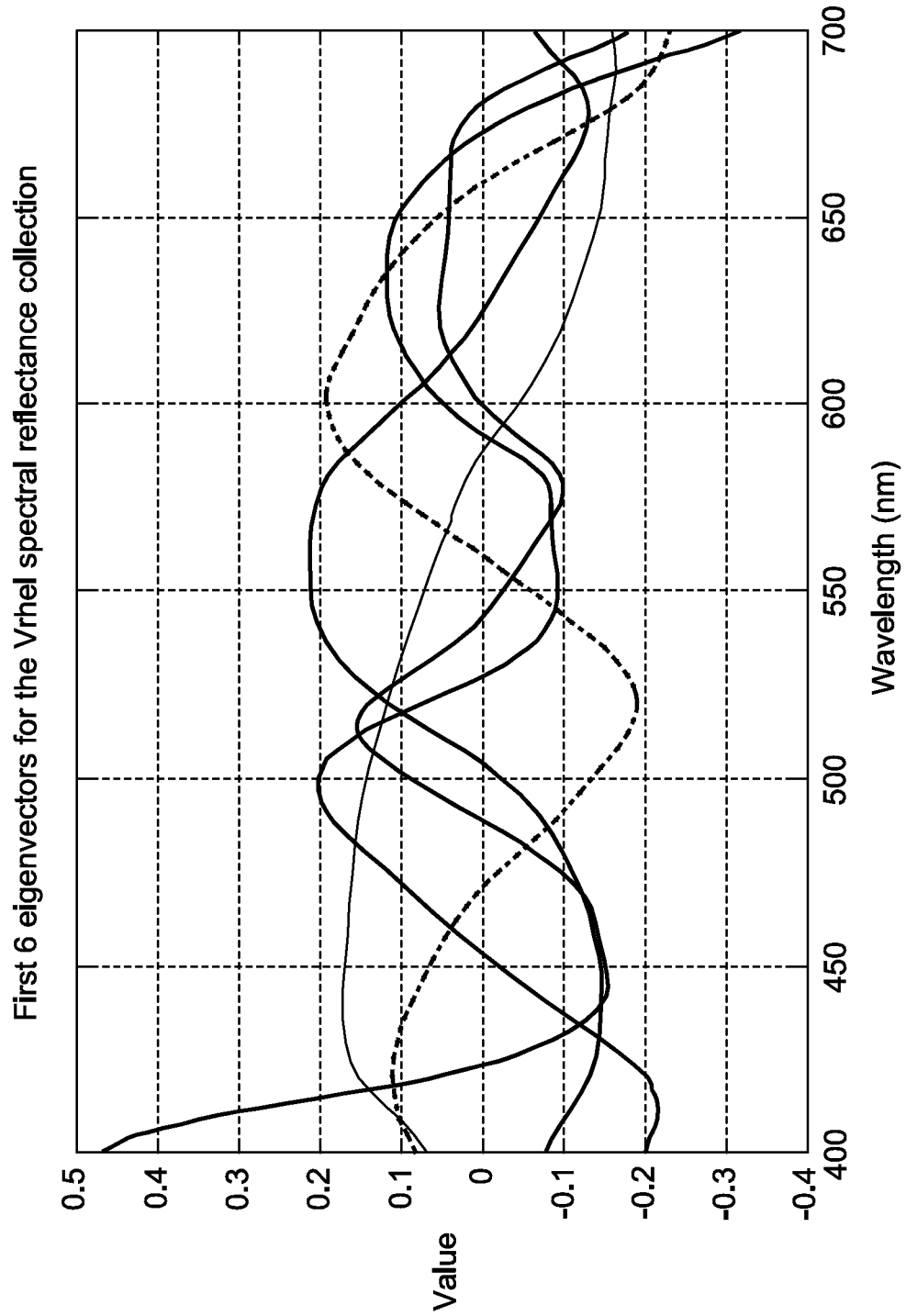
FIG. 9 is a view for explaining eigenvectors of the database of FIG. 8 according to an example embodiment.

Eigenvector analysis is performed for this collection of spectral reflectances, and the first 5 eigenvectors are shown in FIG. 9.

In step 453, the spectral profile information for the scene is matched against the database. The matching can include matching the calculated coefficients of basis vectors of the image data from the sample image against the stored coefficients of basis vectors of the spectral profiles. For example, the matching might try to match the coefficients against the most closely correlated coefficients.

In the example shown in FIGS. 5 to 9, the coefficients of basis vectors calculated in step 451 for the captured black hair data A_hair=[0.006, −0.011, −0.001, −0.007, 0.017, 0.118] and the dark skin data A_skin=[0.0002, −0.029, −0.027, −0.035, −0.043, 0.429] are compared with the plural profiles of spectral signatures accessed in step 452 to see if there are matches with spectral signatures of pre-identified objects in the database. If there are matches, the respective spectral signatures are then used to segment areas of the image with different spectral properties.

In some instances, the spectral profiles may have high dimensionality with more than three spectral components. On the other hand, the spectral profiles may have low spectral dimensionality with a relatively low number of spectral components, such as three or fewer spectral components. In particular, it may be unnecessary and impractical to attempt to specifically identify the exact material for each object in the scene. For example, outside of a specific setting in which all potential materials are known, it may not be possible to specifically identify an exact material, as this would require an enormous database of plural spectral profiles for all possible materials. Nevertheless, even spectral profiles comprised of a relatively low number of spectral components can be used to differentiate between distinct areas made up of different materials, so as to adjust the areas corresponding to these materials for post-capture rendering.

In step 454, there is a determination of whether the calculated coefficients are sufficiently close to any of the profiles in the spectral profile database. For example, there may be a case where an object in the scene does not match any of the stored spectral profiles. In such a case, it might be best to leave that object alone (i.e., not adjust capture parameters therefor), as the object does not match any of the materials that the adjustments are designed for. Thus, for example, if an object is very different from the closest stored spectral profile, forcing the object to take on that adjustment might incorrectly change the color of the object. In some examples, a correlation analysis could be used, with a threshold correlation number needed to match to something in the database.

Conversely, the LUT might include "gray areas" for each material in the database, so that the calculated coefficients are not required to match the profiles exactly. Under such an example, objects that are relatively close to the coefficients for a particular material would simply be mapped to that material. This can be done, for example, by employing correlation analysis between the spectral profile and the database. The user or system might also be able to alter the threshold correlation number in order to broaden or narrow the range of spectra which will correspond to particular materials.

In still another example, if the calculated coefficients for a region or scene are not close to any of the profiles in the profile database, but at the same time the RGB (or other color space) values are similar, it might be an indication that the RGB values need to be changed via calibration of image sensor 14 or otherwise.

If no area in the image is sufficiently close to a profile in the database, the process ends without any adjustments. On the other hand, if one or more areas in the image match profiles in the spectral profile database, the process proceeds to step 455.

In step 455, materials for objects in the scene are identified, using matches between the spectral profile information for the scene against the database. For example, if the coefficients of an object match (or are within a given similarity range as) the coefficients of a curve in the database, the material corresponding to the matching curve in the database is assigned to the relevant spectral profile information.

In step 456, the capture mask is constructed so as to adjust capture parameters for areas or objects comprised of different materials. For example, as discussed above, a LUT might map materials to adjustments corresponding to the material. For example, a LUT may map ocean water to an adjustment which amplifies the blue of the ocean, to make brown skin browner, or to map grass or leaves to an adjustment which amplifies the green. Of course, other embodiments are possible. The LUT could be preset, or could be set or changed according to the user preferences. For example, a user might be provided with a menu by which to set changes corresponding to particular materials.

In that regard, the LUT mapping spectral signatures and basis vector coefficients to materials could be separate from the LUT which indicates which image adjustments are performed for which material, or this information could be combined into a single LUT.

Following construction of the capture mask, an image is captured with the second spectral capture mask applied to the imaging assembly, as described above with respect to step 406.

Figure 10:
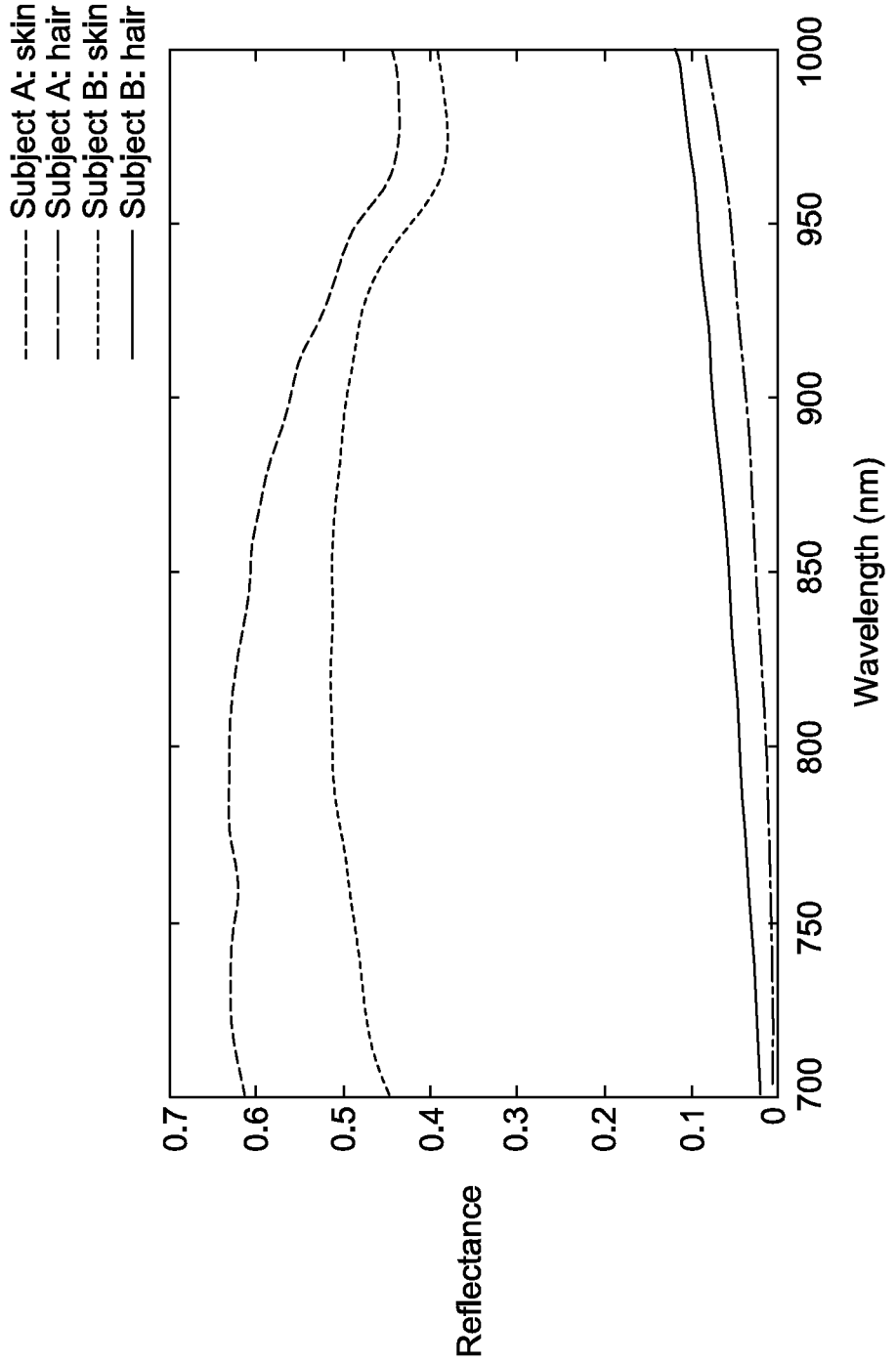
FIG. 10 is a view for explaining the use of spectral reflectances to identify distinct areas in a captured image.

FIG. 10 is a view for explaining the use of spectral reflectances to identify distinct areas in a captured image.

In particular, FIG. 10 depicts different spectral reflectance curves for skin and hair of two separate subjects. As can be seen from FIG. 10, the respective skin and hair of subjects A and B clearly have different spectral reflectances. Thus, according to the arrangements described above, the location of one or more objects or regions in the scene comprised of these materials can be distinctly identified, and a capture mask can be constructed to as to emphasize differences between these materials in a subsequent capture.

According to other embodiments contemplated by the present disclosure, example embodiments may include a computer processor such as a single core or multi-core central processing unit (CPU) or micro-processing unit (MPU), which is constructed to realize the functionality described above. The computer processor might be incorporated in a stand-alone apparatus or in a multi-component apparatus, or might comprise multiple computer processors which are constructed to work together to realize such functionality. The computer processor or processors execute a computer-executable program (sometimes referred to as computer-executable instructions or computer-executable code) to perform some or all of the above-described functions. The computer-executable program may be pre-stored in the computer processor(s), or the computer processor(s) may be functionally connected for access to a non-transitory computer-readable storage medium on which the computer-executable program or program steps are stored. For these purposes, access to the non-transitory computer-readable storage medium may be a local access such as by access via a local memory bus structure, or may be a remote access such as by access via a wired or wireless network or Internet. The computer processor(s) may thereafter be operated to execute the computer-executable program or program steps to perform functions of the above-described embodiments.

According to still further embodiments contemplated by the present disclosure, example embodiments may include methods in which the functionality described above is performed by a computer processor such as a single core or multi-core central processing unit (CPU) or micro-processing unit (MPU). As explained above, the computer processor might be incorporated in a stand-alone apparatus or in a multi-component apparatus, or might comprise multiple computer processors which work together to perform such functionality. The computer processor or processors execute a computer-executable program (sometimes referred to as computer-executable instructions or computer-executable code) to perform some or all of the above-described functions. The computer-executable program may be pre-stored in the computer processor(s), or the computer processor(s) may be functionally connected for access to a non-transitory computer-readable storage medium on which the computer-executable program or program steps are stored. Access to the non-transitory computer-readable storage medium may form part of the method of the embodiment. For these purposes, access to the non-transitory computer-readable storage medium may be a local access such as by access via a local memory bus structure, or may be a remote access such as by access via a wired or wireless network or Internet. The computer processor(s) is/are thereafter operated to execute the computer-executable program or program steps to perform functions of the above-described embodiments.

The non-transitory computer-readable storage medium on which a computer-executable program or program steps are stored may be any of a wide variety of tangible storage devices which are constructed to retrievably store data, including, for example, any of a flexible disk (floppy disk), a hard disk, an optical disk, a magneto-optical disk, a compact disc (CD), a digital versatile disc (DVD), micro-drive, a read only memory (ROM), random access memory (RAM), erasable programmable read only memory (EPROM), electrically erasable programmable read only memory (EEPROM), dynamic random access memory (DRAM), video RAM (VRAM), a magnetic tape or card, optical card, nanosystem, molecular memory integrated circuit, redundant array of independent disks (RAID), a nonvolatile memory card, a flash memory device, a storage of distributed computing systems and the like. The storage medium may be a function expansion unit removably inserted in and/or remotely accessed by the apparatus or system for use with the computer processor(s).

This disclosure has provided a detailed description with respect to particular representative embodiments. It is understood that the scope of the appended claims is not limited to the above-described embodiments and that various changes and modifications may be made without departing from the scope of the claims.

What is claimed is:

1. A method of image capture using an image capture device which includes an imaging assembly having a spectral sensitivity tunable in accordance with a spectral capture mask, the method comprising:
    a pre-capture step of capturing a sample image of a scene using the imaging assembly tuned by a first spectral capture mask;
    a construction step of constructing a second spectral capture mask by calculations which use image data of the sample image, wherein the second spectral capture mask is constructed to tune the spectral sensitivity of the imaging assembly so as to adjust respective capture parameters for different objects in the scene to increase differentiation between the different objects in the scene, and wherein the second spectral capture mask is constructed to tune the spectral sensitivity of the imaging assembly so as to permit visual differentiation between objects in the scene formed from different materials but which would otherwise have similar tri-stimulus color values:
    an application step of applying the second spectral capture mask to the imaging assembly; and
    a capture step of capturing an image of the scene, wherein the image of the scene is captured with the second spectral capture mask applied to the imaging assembly.

2. The method according to claim 1, further comprising matching spectral information of the image data of the sample image against plural spectral profiles of which each maps a material to a corresponding spectral profile, so as to identify the different materials in the scene.

3. The method according to claim 2, wherein the first spectral capture mask has high spectral dimensionality with more than three spectral components.

4. The method according to claim 3, wherein the spectral profiles have high dimensionality with more than three spectral components.

5. The method according to claim 2, wherein matching comprises:
    calculating spectral profile information for the scene from the captured image data for the sample image;
    accessing a database of the plural spectral profiles of which each maps a material to a corresponding spectral profile reflected therefrom;
    matching the spectral profile information for the scene against the database; and
    identifying materials for objects in the scene by using matches between the spectral profile information for the scene against the database.

6. The method according to claim 5, wherein each spectral profile is comprised of stored coefficients of basis vectors for a predesignated set of more than three basis vectors.

7. The method according to claim 6, wherein the step of calculating spectral profile information for the scene includes the step of calculating coefficients of basis vectors of the image data for the predesignated set of more than three basis vectors; and wherein the matching step comprises matching of the calculated coefficients of basis vectors of the image data against the stored coefficients of basis vectors of the spectral profiles.

8. The method according to claim 1, further comprising determining tri-stimulus device-independent color values from the image data for the sample image, wherein such tri-stimulus device-independent color values are used in the constructing step.

9. The method according to claim 1, wherein the second spectral capture mask has low spectral dimensionality with three or fewer spectral components.

10. The method according to claim 1, wherein the image data captured in the capture step is comprised of tri-stimulus device independent image data.

11. The method according to claim 1, further comprising:
constructing metadata which identifies materials for objects in the scene; and
embedding the identifying metadata with the captured image data for the scene.

12. The method according to claim 11, further comprising rendering of the image data for the scene by using the metadata that identifies the material for objects in the scene.

13. The method according to claim 11, further comprising rendering of the image data for the scene by using the metadata that identifies the material for objects in the scene, and wherein image data having similar tri-stimulus values is rendered differently in dependence on the metadata.

14. The method according to claim 1, wherein the imaging assembly comprises an image sensor which has a tunable spectral response.

15. The method according to claim 1, wherein the imaging assembly comprises an image sensor and a preceding color filter array which has a tunable spectral response.

16. An image capture apparatus which includes an imaging assembly having a spectral sensitivity tunable in accordance with a spectral capture mask, comprising:
a computer-readable memory constructed to store computer-executable process steps; and
a processor constructed to execute the computer-executable process steps stored in the memory;
wherein the process steps stored in the memory cause the processor to:
perform a pre-capture of capturing a sample image of a scene using the imaging assembly tuned by a first spectral capture mask;
construct a second spectral capture mask by calculations which use image data of the sample image, wherein the second spectral capture mask is constructed to tune the spectral sensitivity of the imaging assembly so as to adjust respective capture parameters for different objects in the scene to increase differentiation between the different objects in the scene, and wherein the second spectral capture mask is constructed to tune the spectral sensitivity of the imaging assembly so as to permit visual differentiation between objects in the scene formed from different materials but which would otherwise have similar tri-stimulus color values;
apply the second spectral capture mask to the imaging assembly; and
capture an image of the scene, wherein the image of the scene is captured with the second spectral capture mask applied to the imaging assembly.

17. The apparatus according to claim 16, wherein the process steps stored in the memory cause the processor to match spectral information of the image data of the sample image against plural spectral profiles of which each maps a material to a corresponding spectral profile, so as to identify the different materials in the scene.

18. The apparatus according to claim 17, wherein the first spectral capture mask has high spectral dimensionality with more than three spectral components.

19. The apparatus according to claim 18, wherein the spectral profiles have high dimensionality with more than three spectral components.

20. The apparatus according to claim 17, wherein matching comprises:
calculating spectral profile information for the scene from the captured image data for the sample image;
accessing a database of the plural spectral profiles of which each maps a material to a corresponding spectral profile reflected therefrom;
matching the spectral profile information for the scene against the database; and
identifying materials for objects in the scene by using matches between the spectral profile information for the scene against the database.

21. The apparatus according to claim 20, wherein each spectral profile is comprised of stored coefficients of basis vectors for a predesignated set of more than three basis vectors.

22. The apparatus according to claim 21, wherein the process steps stored in the memory cause the processor to calculate spectral profile information for the scene includes the step of calculating coefficients of basis vectors of the image data for the predesignated set of more than three basis vectors, and
wherein the matching comprises matching of the calculated coefficients of basis vectors of the image data against the stored coefficients of basis vectors of the spectral profiles.

23. The apparatus according to claim 16, wherein the process steps stored in the memory cause the processor to determine tri-stimulus device-independent color values from the image data for the sample image, wherein such tri-stimulus device-independent color values are used in the constructing.

24. The apparatus according to claim 16, wherein the second spectral capture mask has low spectral dimensionality with three or fewer spectral components.

25. The apparatus according to claim 16, wherein the image data captured in the capture step is comprised of tri-stimulus device independent image data.

26. The apparatus according to claim 16, wherein the process steps stored in the memory further cause the processor to:
construct metadata which identifies materials for objects in the scene; and
embed the identifying metadata with the captured image data for the scene.

27. The apparatus according to claim 26, wherein the process steps stored in the memory cause the processor to render the image data for the scene by using the metadata that identifies the material for objects in the scene.

28. The apparatus according to claim 26, wherein the process steps stored in the memory cause the processor to render of the image data for the scene by using the metadata that identifies the material for objects in the scene, and wherein image data having similar tri-stimulus values is rendered differently in dependence on the metadata.

29. The apparatus according to claim 16, wherein the imaging assembly comprises an image sensor which has a tunable spectral response.

30. The apparatus according to claim 16, wherein the imaging assembly comprises an image sensor and a preceding color filter array which has a tunable spectral response.

31. An image capture module comprising:
    a pre-capture module for capturing a sample image of a scene using the imaging assembly tuned by a first spectral capture mask;
    a construction module for constructing a second spectral capture mask by calculations which use image data of the sample image, wherein the second spectral capture mask is constructed to tune the spectral sensitivity of the imaging assembly so as to adjust respective capture parameters for different objects in the scene to increase differentiation between the different objects in the scene, and wherein the second spectral capture mask is constructed to tune the spectral sensitivity of the imaging assembly so as to permit visual differentiation between objects in the scene formed from different materials but which would otherwise have similar tri-stimulus color values;
    an application module for applying the second spectral capture mask to the imaging assembly; and
    a capture module for capturing an image of the scene, wherein the image of the scene is captured with the second spectral capture mask applied to the imaging assembly.

32. The image capture module according to claim 31, wherein spectral information of the image data of the sample image is matched against plural spectral profiles of which each maps a material to a corresponding spectral profile, so as to identify the different materials in the scene.

33. The image capture module according to claim 32, wherein the first spectral capture mask has high spectral dimensionality with more than three spectral components.

34. The image capture module according to claim 33, wherein the spectral profiles have high dimensionality with more than three spectral components.

35. The image capture module according to claim 32, wherein matching comprises:
    calculating spectral profile information for the scene from the captured image data for the sample image;
    accessing a database of the plural spectral profiles of which each maps a material to a corresponding spectral profile reflected therefrom;
    matching the spectral profile information for the scene against the database; and
    identifying materials for objects in the scene by using matches between the spectral profile information for the scene against the database.

36. The image capture module according to claim 35, wherein each spectral profile is comprised of stored coefficients of basis vectors for a predesignated set of more than three basis vectors.

37. The image capture module according to claim 36, wherein calculating spectral profile information for the scene includes calculating coefficients of basis vectors of the image data for the predesignated set of more than three basis vectors; and
    wherein the matching comprises matching of the calculated coefficients of basis vectors of the image data against the stored coefficients of basis vectors of the spectral profiles.

38. The image capture module according to claim 31, wherein tri-stimulus device-independent color values are determined from the image data for the sample image, and wherein such tri-stimulus device-independent color values are used in the constructing.

39. The image capture module according to claim 31, wherein the second spectral capture mask has low spectral dimensionality with three or fewer spectral components.

40. The image capture module according to claim 31, wherein the image data captured in the capture step is comprised of tri-stimulus device independent image data.

41. The image capture module according to claim 31, wherein metadata is constructed which identifies materials for objects in the scene, and wherein the identifying metadata is embedded with the captured image data for the scene.

42. The image capture module according to claim 41, wherein the image data for the scene is rendered by using the metadata that identifies the material for objects in the scene.

43. The image capture module according to claim 41, wherein the image data for the scene is rendered by using the metadata that identifies the material for objects in the scene, and wherein image data having similar tri-stimulus values is rendered differently in dependence on the metadata.

44. The image capture module according to claim 31, wherein the imaging assembly comprises an image sensor which has a tunable spectral response.

45. The image capture module according to claim 31, wherein the imaging assembly comprises an image sensor and a preceding color filter array which has a tunable spectral response.

46. A non-transitory computer-readable storage medium retrievably storing computer-executable process steps for causing a computer to perform an image capture method, the method comprising:
    a pre-capture step of capturing a sample image of a scene using an imaging assembly tuned by a first spectral capture mask;
    a construction step of constructing a second spectral capture mask by calculations which use image data of the sample image, wherein the second spectral capture mask is constructed to tune the spectral sensitivity of the imaging assembly so as to adjust respective capture parameters for different objects in the scene to increase differentiation between the different objects in the scene, and wherein the second spectral capture mask is constructed to tune the spectral sensitivity of the imaging assembly so as to permit visual differentiation between objects in the scene formed from different materials but which would otherwise have similar tri-stimulus color values;
    an application step of applying the second spectral capture mask to the imaging assembly; and
    a capture step of capturing an image of the scene, wherein the image of the scene is captured with the second spectral capture mask applied to the imaging assembly.

47. The storage medium according to claim 46, wherein the method further comprises matching spectral information of the image data of the sample image against plural spectral profiles of which each maps a material to a corresponding spectral profile, so as to identify the different materials in the scene.

48. The storage medium according to claim 47, wherein the first spectral capture mask has high spectral dimensionality with more than three spectral components.

49. The storage medium according to claim 48, wherein the spectral profiles have high dimensionality with more than three spectral components.

50. The storage medium according to claim 47, wherein matching comprises:
    calculating spectral profile information for the scene from the captured image data for the sample image;

accessing a database of the plural spectral profiles of which each maps a material to a corresponding spectral profile reflected therefrom;

matching the spectral profile information for the scene against the database; and identifying materials for objects in the scene by using matches between the spectral profile information for the scene against the database.

51. The storage medium according to claim 50, wherein each spectral profile is comprised of stored coefficients of basis vectors for a predesignated set of more than three basis vectors.

52. The storage medium according to claim 51, wherein the step of calculating spectral profile information for the scene includes the step of calculating coefficients of basis vectors of the image data for the predesignated set of more than three basis vectors; and wherein the matching step comprises matching of the calculated coefficients of basis vectors of the image data against the stored coefficients of basis vectors of the spectral profiles.

53. The storage medium according to claim 46, wherein the method further comprises determining tri-stimulus device-independent color values from the image data for the sample image, wherein such tri-stimulus device-independent color values are used in the constructing step.

54. The storage medium according to claim 46, wherein the second spectral capture mask has low spectral dimensionality with three or fewer spectral components.

55. The storage medium according to claim 46, wherein the image data captured in the capture step is comprised of tri-stimulus device independent image data.

56. The storage medium according to claim 46, wherein the method further comprises:

constructing metadata which identifies materials for objects in the scene; and embedding the identifying metadata with the captured image data for the scene.

57. The storage medium according to claim 56, wherein the method further comprises rendering of the image data for the scene by using the metadata that identifies the material for objects in the scene.

58. The storage medium according to claim 56, wherein the method further comprises rendering of the image data for the scene by using the metadata that identifies the material for objects in the scene, and wherein image data having similar tri-stimulus values is rendered differently in dependence on the metadata.

59. The storage medium according to claim 46, wherein the imaging assembly comprises an image sensor which has a tunable spectral response.

60. The storage medium according to claim 46, wherein the imaging assembly comprises an image sensor and a preceding color filter array which has a tunable spectral response.

* * * * *